June 6, 1939.　　O. J. KUENHOLD　　2,161,679
HEAT CONTROL SYSTEM
Filed May 15, 1935　　12 Sheets-Sheet 1

INVENTOR.
Otto J. Kuenhold
BY
Fay, Oberlin + Fay
ATTORNEYS.

June 6, 1939.　　　O. J. KUENHOLD　　　2,161,679
HEAT CONTROL SYSTEM
Filed May 15, 1935　　　12 Sheets-Sheet 2
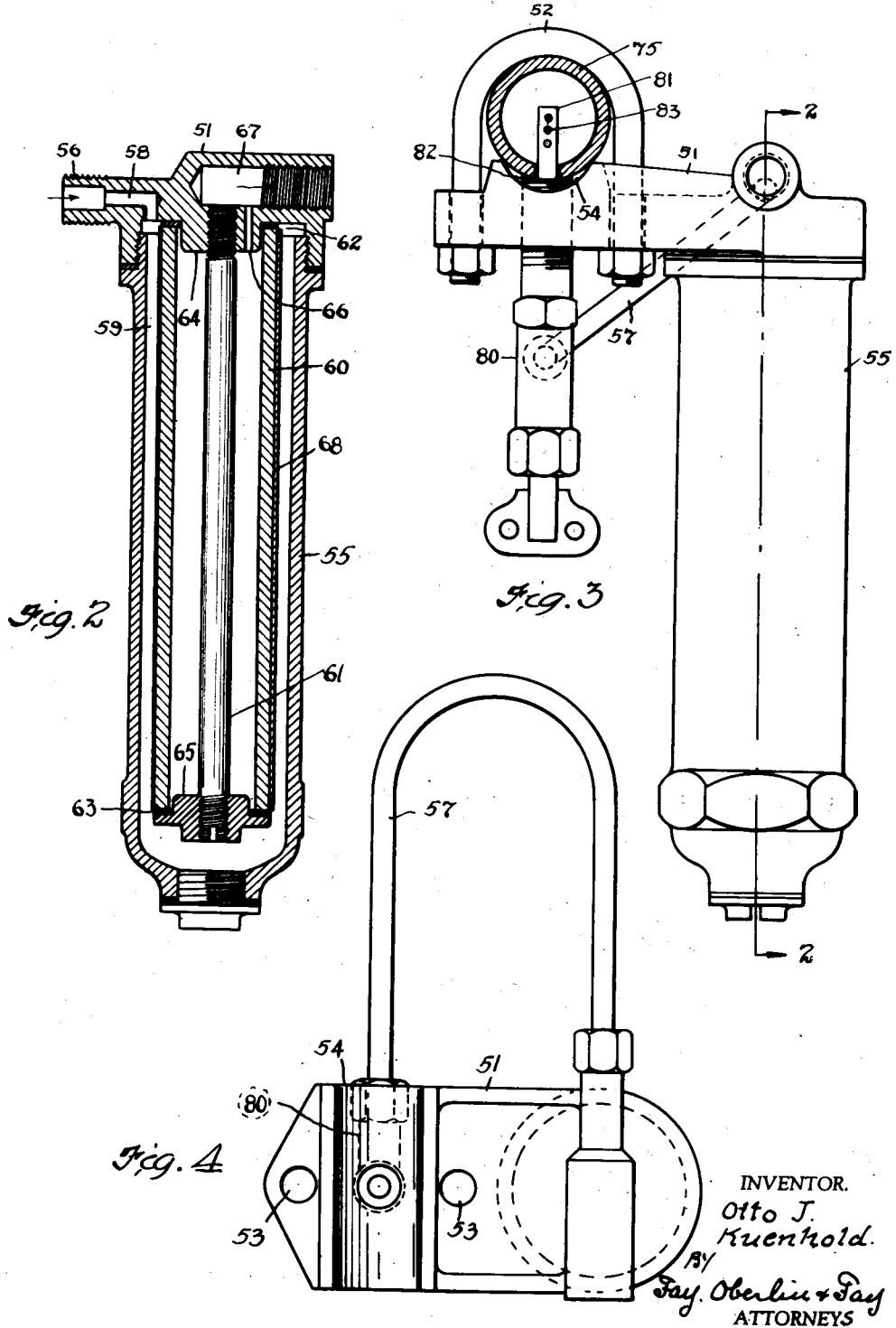
INVENTOR.
Otto J. Kuenhold.
BY
Fay, Oberlin & Fay
ATTORNEYS INVENTOR.
Otto J. Kuenhold
BY
Fay, Oberlin & Fay
ATTORNEYS

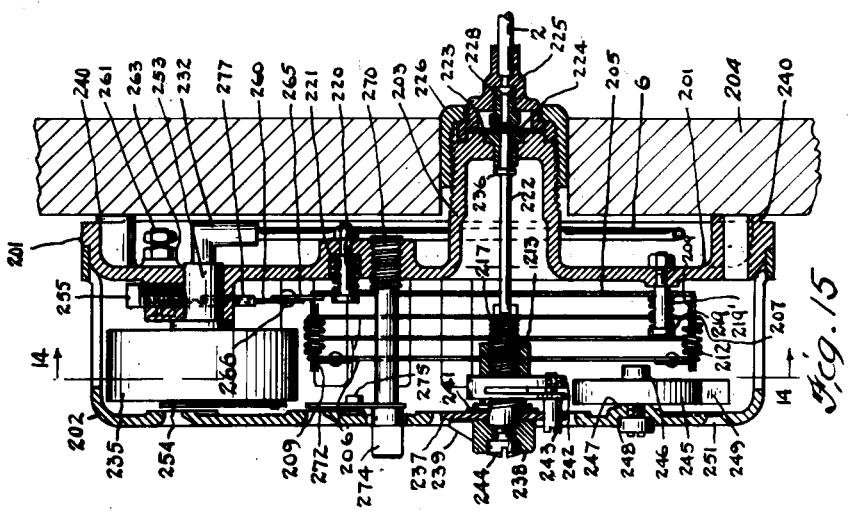
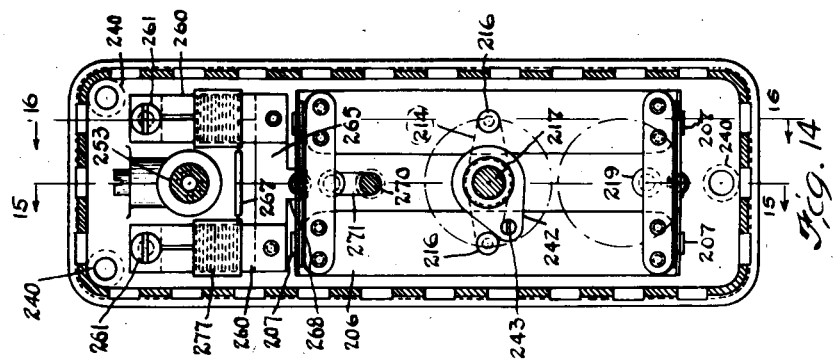
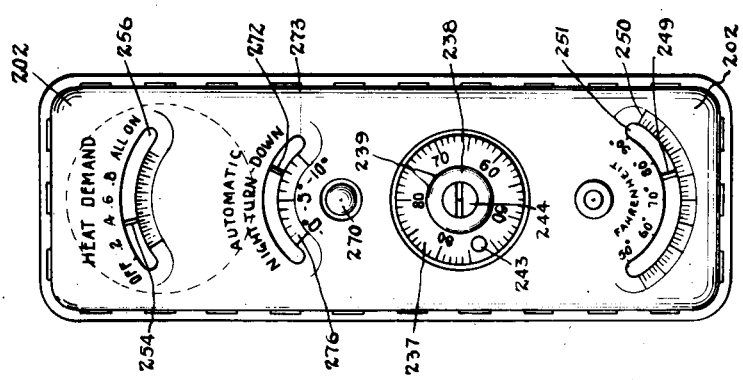

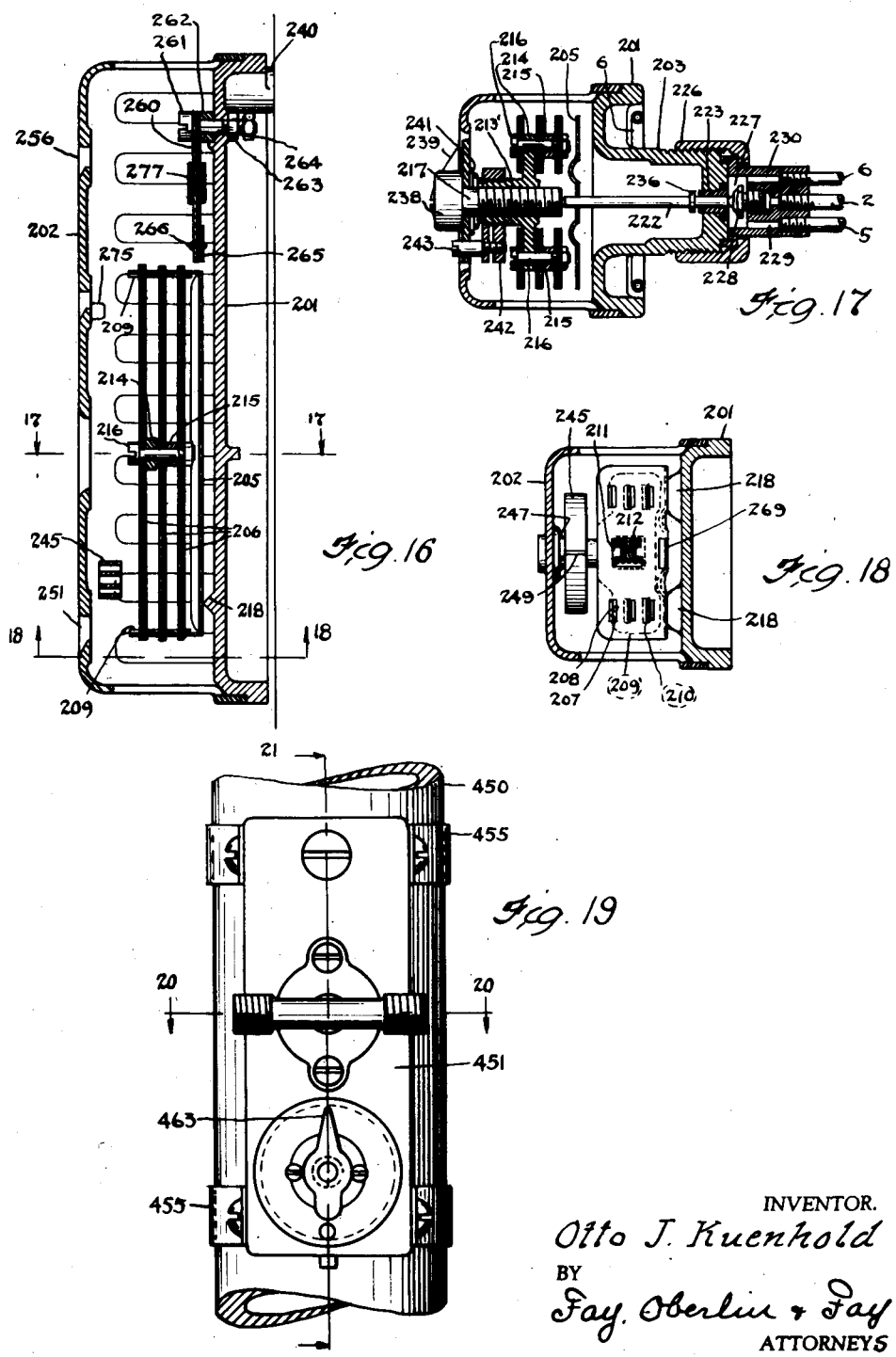

June 6, 1939.　　　O. J. KUENHOLD　　　2,161,679
HEAT CONTROL SYSTEM
Filed May 15, 1935　　　12 Sheets-Sheet 6

INVENTOR.
Otto J. Kuenhold
BY
Fay, Oberlin & Fay
ATTORNEYS

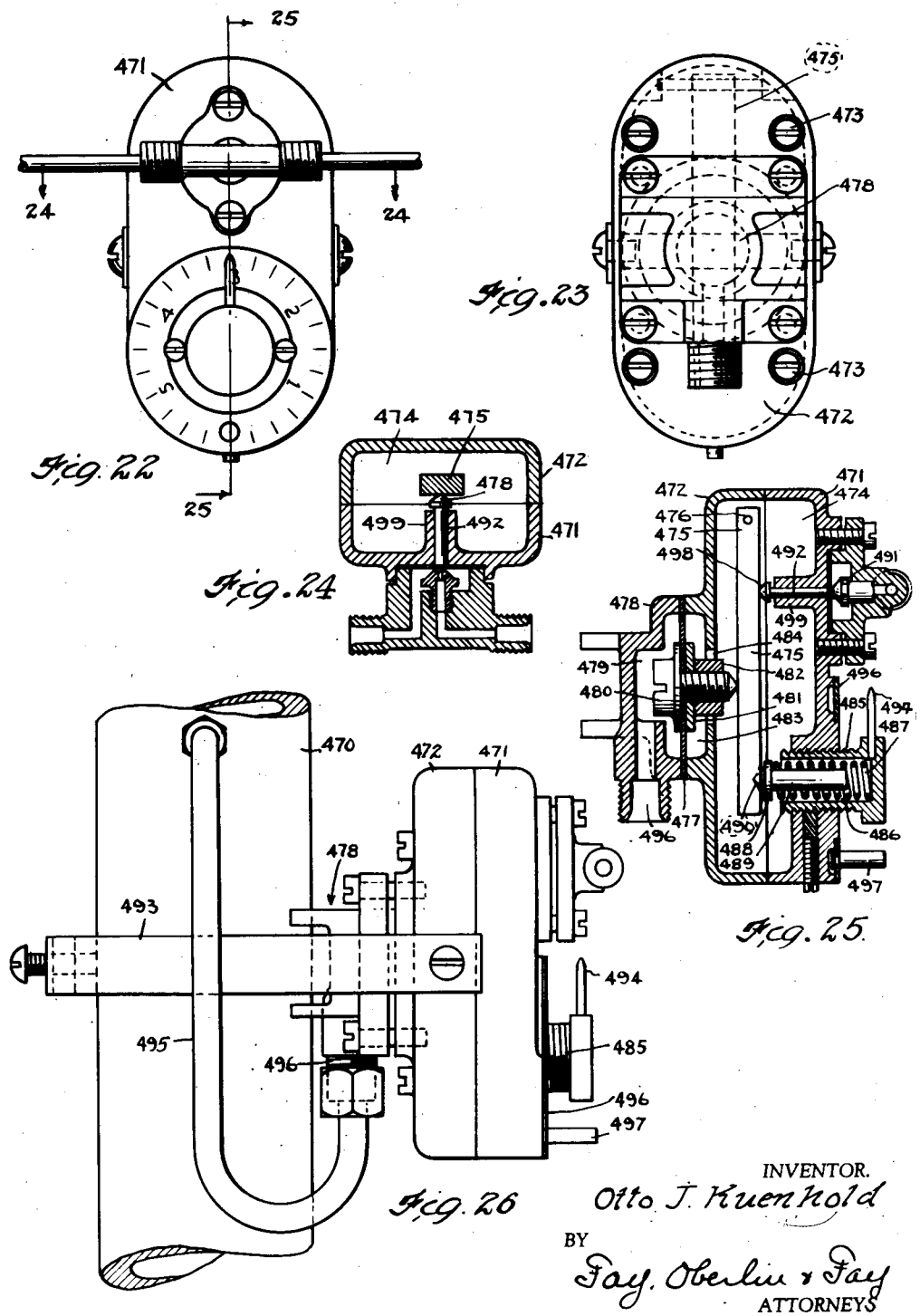

June 6, 1939.  O. J. KUENHOLD  2,161,679
HEAT CONTROL SYSTEM
Filed May 15, 1935  12 Sheets-Sheet 8
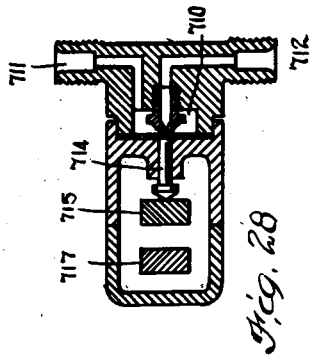
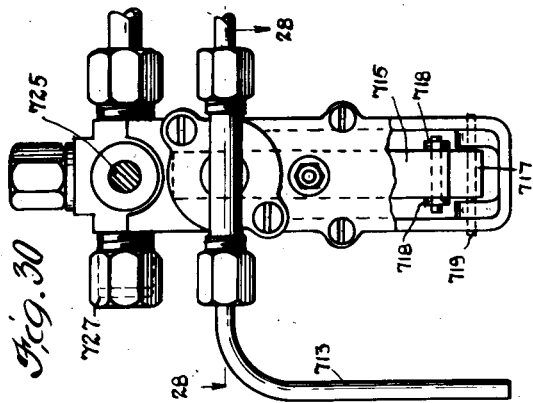
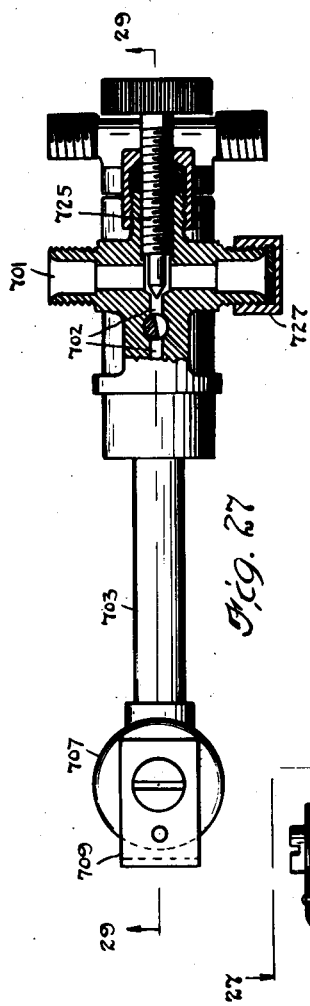
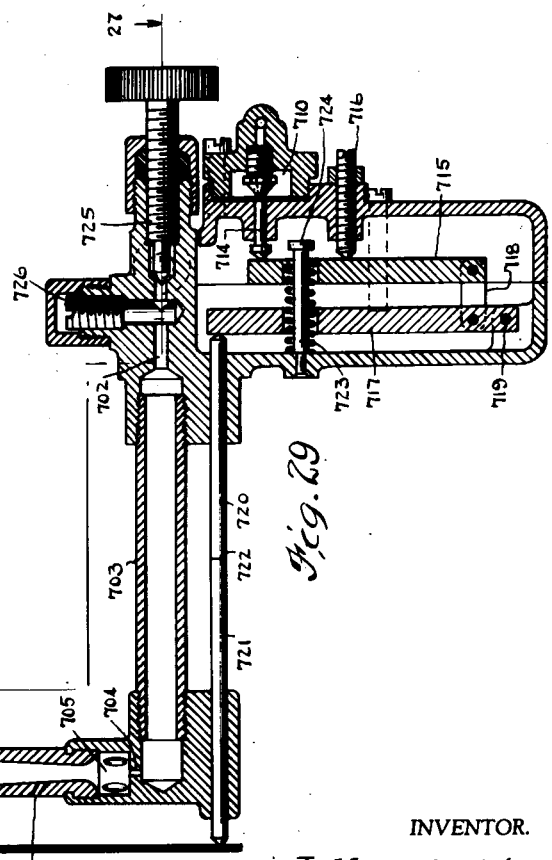
INVENTOR.
Otto J. Kuenhold
BY
Fay, Oberlin & Fay
ATTORNEYS June 6, 1939.  O. J. KUENHOLD  2,161,679
HEAT CONTROL SYSTEM
Filed May 15, 1935  12 Sheets-Sheet 9

INVENTOR.
Otto J. Kuenhold
BY
Fay, Oberlin & Fay
ATTORNEYS.

June 6, 1939.   O. J. KUENHOLD   2,161,679
HEAT CONTROL SYSTEM
Filed May 15, 1935   12 Sheets-Sheet 11

INVENTOR.
Otto J. Kuenhold
BY
Fay, Oberlin & Fay
ATTORNEYS.

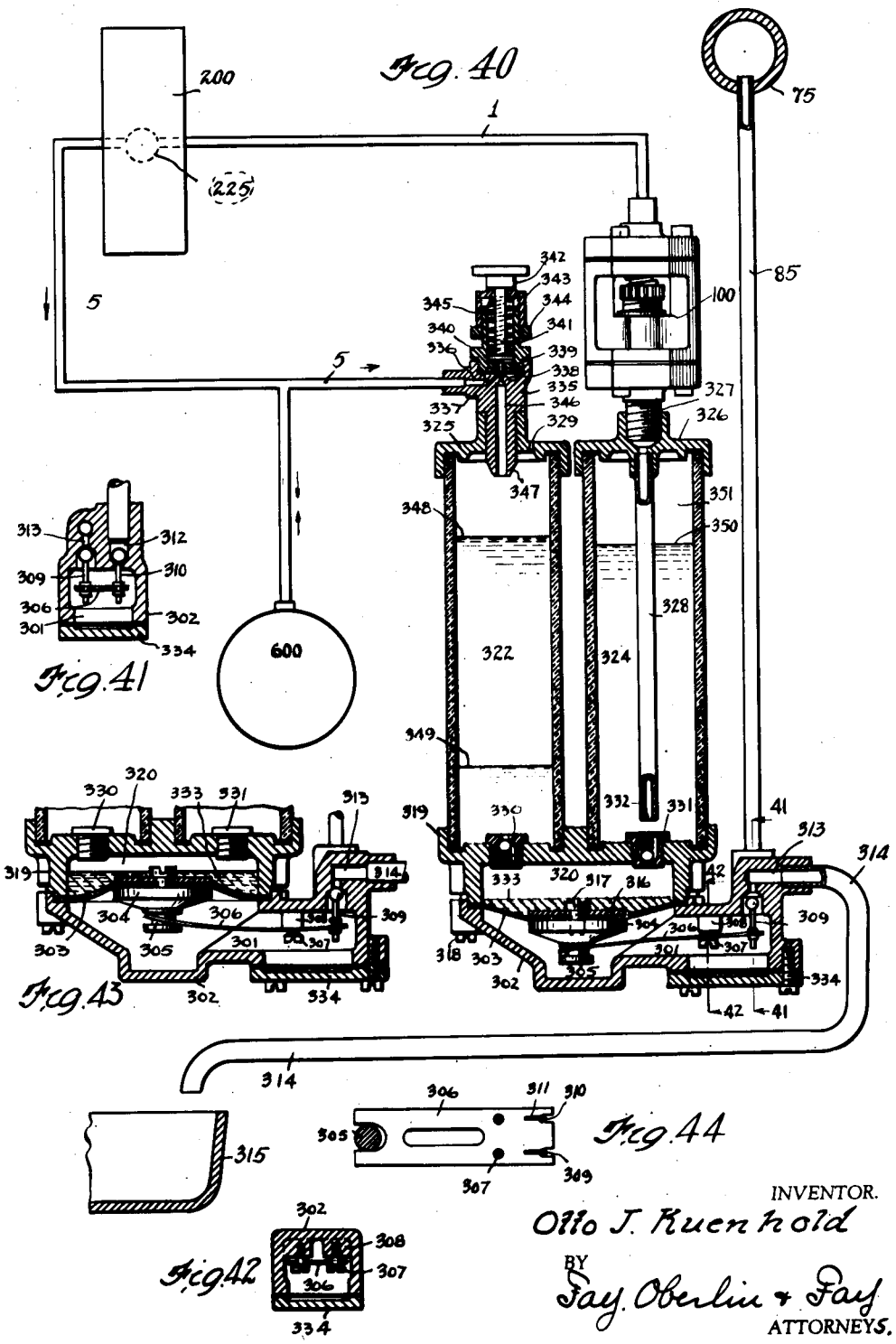

Patented June 6, 1939

2,161,679

UNITED STATES PATENT OFFICE 2,161,679

HEAT CONTROL SYSTEM

Otto J. Kuenhold, Shaker Heights, Ohio, assignor to Monmouth Products Company, Cleveland, Ohio, a corporation of Ohio Application May 15, 1935, Serial No. 21,576

11 Claims. (Cl. 236—9)

My invention pertains to a system for automatically controlling the generation of heat in a furnace or other heat source and the delivery of the heat into the space being heated, so as to accurately and continuously maintain the space temperature for which the system is set. My system may be adapted for completely controlling any central heat source such as heating furnaces, boilers whether fired with gaseous, liquid or solid fuel and if fired with solid fuel whether stoked manually or by power. It will automatically operate all valves, dampers or electrical circuits necessary to control the rate of heat generation and the flow of warm air, steam, hot water, etc. Similarly my system can be adapted to control cooling systems or devices.

The chief advancement in the thermostatic control art achieved by my system is that instead of employing the conventional method of alternately turning the fuel supply or draft dampers to full "on" position when more heat is required, and to full "off" position when less heat is required, my system will automatically turn on as much fuel or draft as is necessary to steadily maintain the desired room temperature and will increase or decrease the heat flow when required but only to the extent required.

The chief advantages of my modulating method of heat delivery control over the conventional alternate on and off method are:—Smoother quieter operation, greater fuel economy, more uniform temperature in the rooms from time to time, from ceiling to floor and throughout the area of the rooms. This last results in markedly greater feeling of comfort for the occupants.

Because of the extreme difficulty of obtaining modulated heat control with electricity as the source of power for operating valves, dampers, etc., I employ water pressure and flow, obtained from domestic water supply pipes.

My control system consists of water filters, pressure governor, room thermostat, auxiliary thermostats, and a water escapement unit to supply and control the water pressure applied to hydraulically actuated valves, dampers, and electrical switches, that control the rate of draft, fuel-feed, air circulation, etc. These hydraulic control units are interconnected and caused to co-act by means of tubing of such small diameter as to resemble wires. Instead of electrical circuits, my system employs hydraulic circuits. The various control units may be connected in parallel or in series. Tiny valves take the place of electric switches and rheostats. Water pressure takes the place of voltage, and water flow rate replaces amperage.

The so-called "thermostats" of my control system are really tiny valves which graduate the water pressure and rate of flow, being actuated by a thermo-expanding element. In this way heat demand is translated into water pressure and the relative pressure determines exactly how far dampers or fuel supply valves are opened. By this method I have found it practical for a very small fraction of a degree of room temperature change to be reflected in a change of hydraulic pressure in the tubing system and hence in the position of dampers, valves, etc.

In actual operation the valves and dampers are in extremely slow but almost constant motion, "floating" at whatever degree of opening is necessary to maintain the "set" room temperature. In case of descending outdoor temperature, the rate of fuel feed or draft will correspondingly increase and when outdoor temperature rises the furnace fire will be correspondingly reduced. Additional objects and advantages shall appear during the following description.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Fig. 1 is a diagrammatic representation of my system as applied to a manually stoked coal furnace. Fig. 2 is a longitudinal section through the water filter. Fig. 3 is an end elevation of the water filter assembly. Fig. 4 is a plan view of the water filter with pipe clamp bolt removed.

Fig. 5 is a transverse section of the water pressure governor. Fig. 6 is one view of the governor; Fig. 7 is a longitudinal section, and Fig. 8 is a view at right angles to that shown by Fig. 6.

Fig. 9 is a transverse section of the auxiliary thermostat on line 9—9 of Fig. 10. Fig. 10 is a longitudinal section of the auxiliary thermostat; and Fig. 11 is an end elevation with the outer cover removed. Fig. 12 is an end view with the cover in place.

Fig. 13 is a front elevation of the room thermostat. Fig. 14 is a section on line 14—14 of Fig. 15. Fig. 15 shows a longitudinal sectional view of the room thermostat on center line 15—15 of Fig. 14.

Fig. 16 shows a longitudinal section of the room thermostat on line 16—16 of Fig. 14, while Fig. 17 shows a transverse sectional view on line 17—17 of Fig. 16; and Fig. 18 shows a transverse sectional view on line 18—18 of Fig. 16.

Fig. 19 shows a front elevation of an alternative (clamp on) form of an auxiliary thermostat; while Fig. 20 shows a horizontal transverse section on line 20—20 of Fig. 19. Fig. 21 is a vertical section of line 21—21 of Fig. 20 of this form of auxiliary thermostat.

Fig. 22 is a front elevation of a stream pressure limit control. Fig. 23 is a rear elevation; Fig. 24 is a transverse sectional view on line 24—24 of Fig. 22; Fig. 25 is a vertical sectional view on the center line 25—25 of Fig. 22; and Fig. 26 is a side view of the steam pressure limit control unit mounted in place upon a steam pipe.

Fig. 27 is a plan view of a safety pilot burner partly in section on line 27 of Fig. 29; Fig. 28 is a transverse sectional view on line 28—28 of Fig. 30; Fig. 29 is a longitudinal sectional view of the safety pilot burner on line 29—29 of Fig. 27; while Fig. 30 is an end view with the valve handle cut off.

Figure 35:
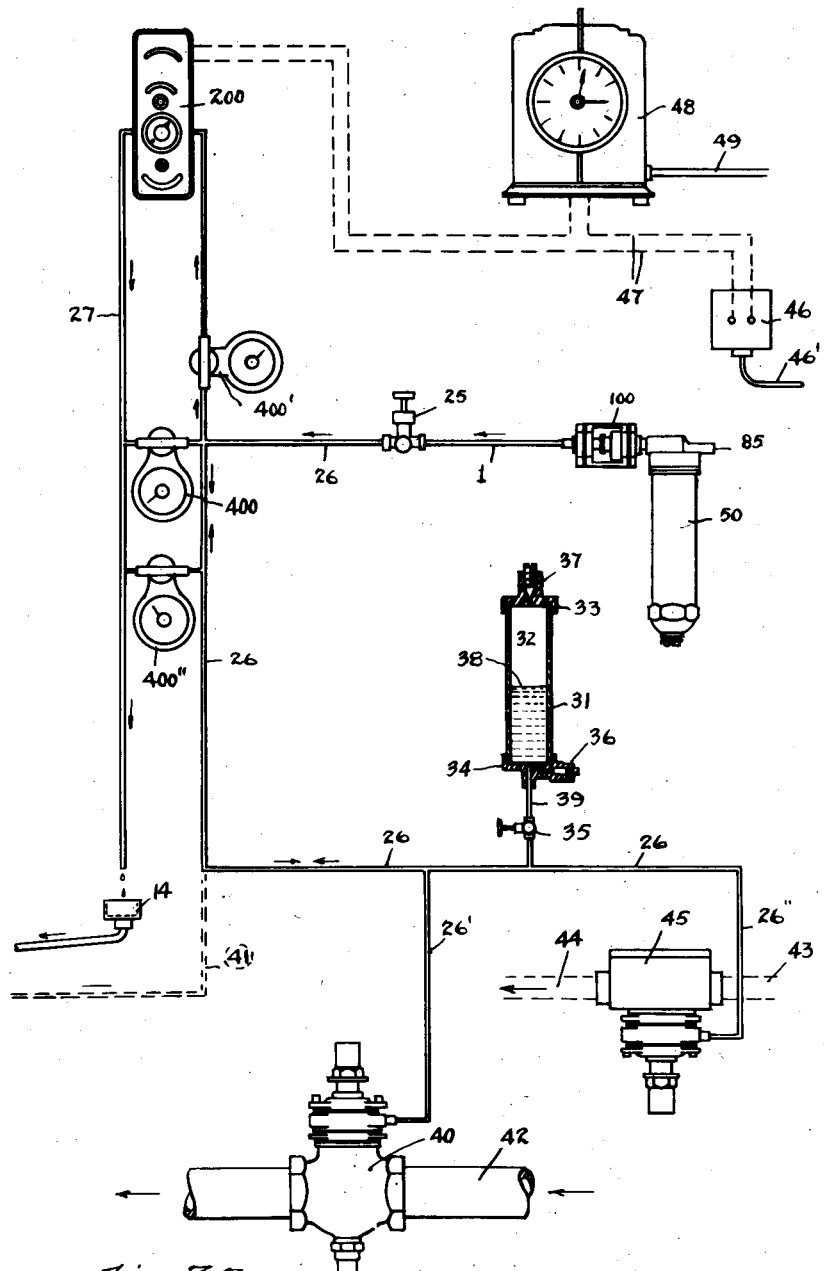
Figure 36:
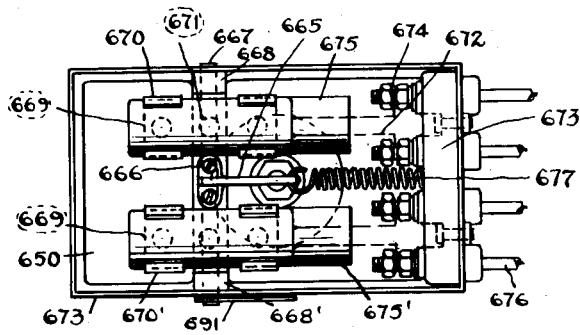
Figure 37:
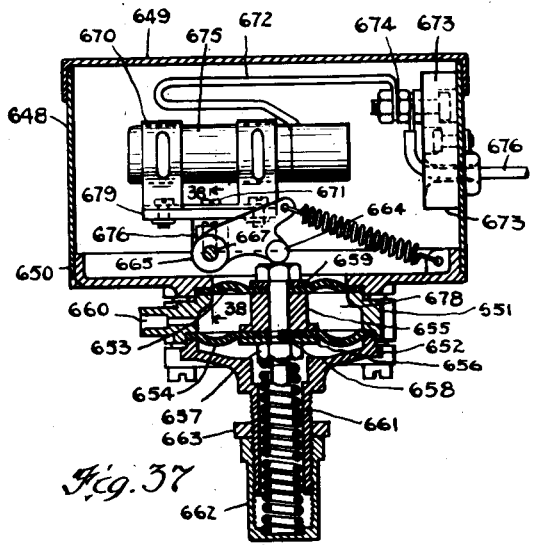
Figure 38:
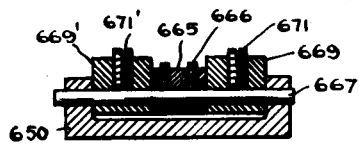
Figure 39:
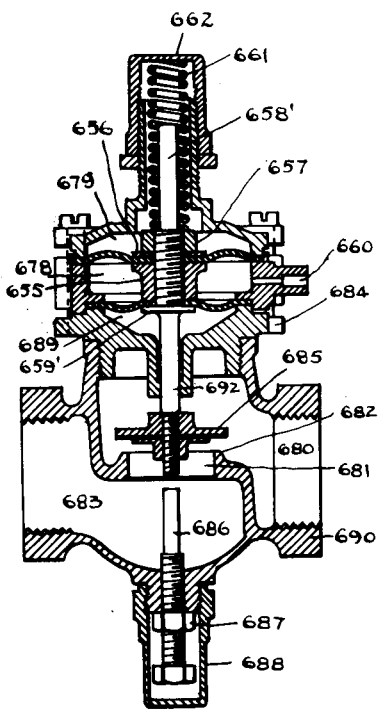

Fig. 35 is a digrammatic representation of an alternative arrangement of my system as applied to a fluid fuel type of furnace, such as a gas or oil fired type; Fig. 36 is a plan view of the hydro electric switch, with the cover removed; Fig. 37 is a vertical section of Fig. 36; Fig. 38 is a detailed vertical section taken along line 38—38 of Fig. 37; Fig. 39 is a vertical sectioned view illustrating the hydro-actuated fuel valve.

Fig. 40 shows the automatic circulating pump in vertical section as applied to the system, the latter being diagrammatically represented; Fig. 41 is a fragmentary section taken upon a plane normal to that of Fig. 40 and substantially along lines 41—41 thereof; Fig. 42 is a fragmentary section taken along a plane normal to that of Fig. 40 and substantially along lines 42—42 thereof; Fig. 43 is a fragmentary view of the lower portion of the automatic circulating pump illustrated in Fig. 40 and showing the parts in alternate position of operation; and Fig. 44 is a plan detail of the valve operating lever of the pump shown in Fig. 40.

*System in general*

My system will now be described, first to give a general comprehension of its main operating principles, then in more detail, and finally as to its further elaboration.

Figure 1:
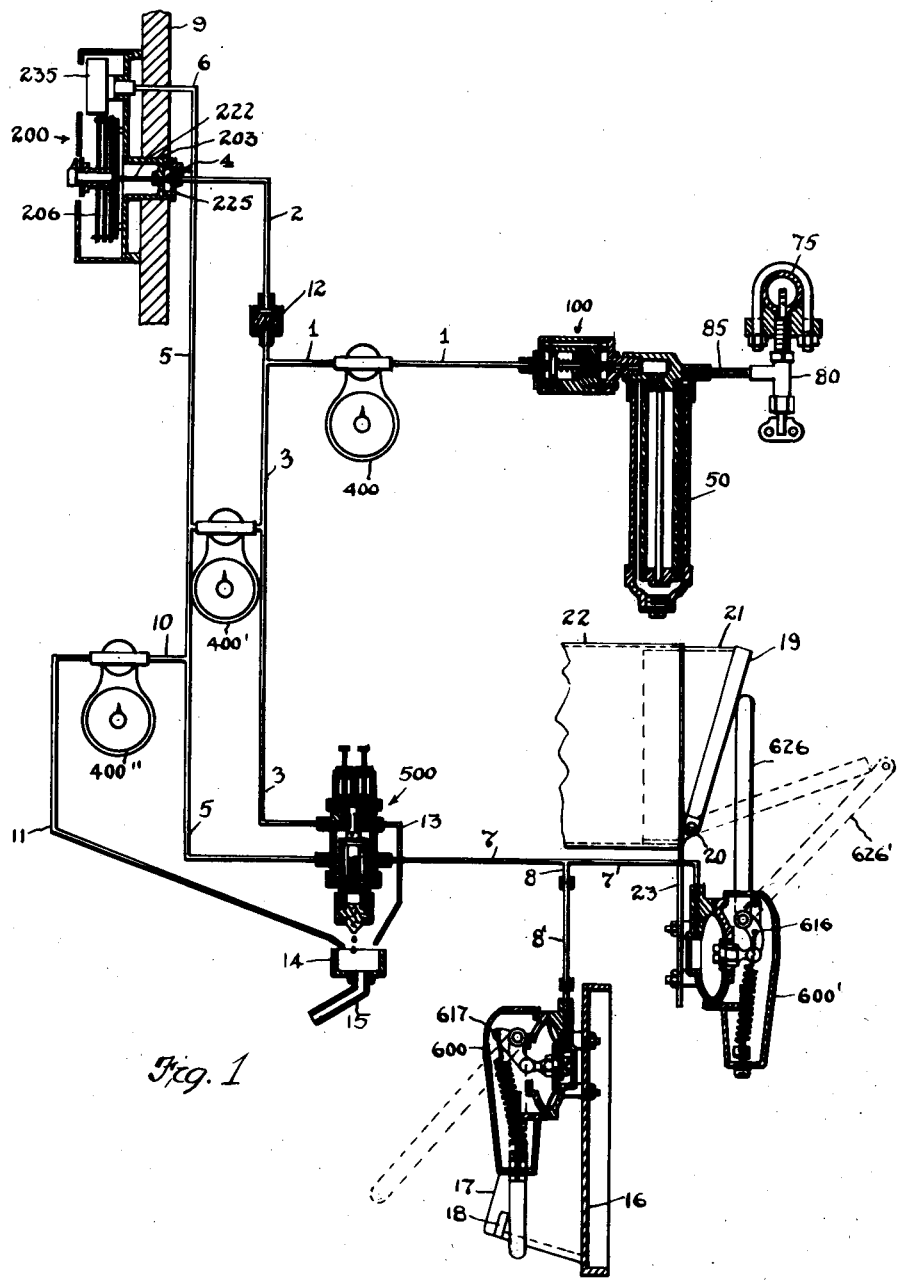

In Fig. 1, 75 represents sectionally any convenient water pipe under "city" pressure which is usually 50 pounds per square inch or more. A main water valve 80 for the control system is tapped into the water pipe and a tube 85 leads the water into the water filter, 50, which removes every particle of floating matter that might otherwise clog the system. The water is then passed through the water pressure governor 100, especially designed for my control system. This will deliver as much or as little water as may be required at constant pressure of, for instance, 30 pounds per square inch. The rate of water feed required seldom exceeds 160 drops per minute. The tubing employed in my system need not have an internal diameter of more than 1/16 inch. The foregoing figures are given to aid comprehension of the operation of this system.

For the present, assume that the auxiliary thermostats 400, 400′ and 400″ are omitted. The water is delivered from the governor through tube 1 into branches 2 and 3, which together with tube 1 constitute the constant pressure tube lines. Tube 3 is a by-pass tube normally closed at its lower terminus and should for the present be disregarded.

Tube 2 carries the water (at constant pressure) into a tiny thermostat valve 225 located in a projecting extension 203 of the room thermostat 200, which projection is inserted into a partition wall 9 of the room as shown. An expanding member 206 in the casing of the thermostat is exposed to room temperature and this actuates the thermostat valve by means of the plunger 222. When the room temperature rises above the "set" temperature, the tiny valve 225 will be actuated toward closed position and upon descending room temperature the tiny valve will be actuated toward open position. I prefer to so proportion the valve and expansion member that the tiny valve will be actuated from its closed to its wide open position by less than 2 degrees of room temperature change, this resulting from approximately 1.6 thousandths of an inch motion of the plunger. These proportions may, however, be varied according to the results desired.

The outlet of the tiny thermostat valve 225 is connected to tube 4 which communicates into tube 5. Tube 6 is a branch connected to a pressure gauge 235 so that the existing pressure down stream from the thermostat valve can be observed at the room thermostat. Tube 5 discharges into a central chamber in the water escapement unit 500. Tube line 7 is also connected into the said central chamber and its branches 8, 8′, and 7 connect into diaphragm chambers in the damper motors 600 and 600′.

Tube lines 4, 5, 6, 7, 8, and 8′ constitute the variable pressure tubing system. As these tubes connect with the damper motors and escapement unit, the same water pressure will exist in all these. The pressure is varied by co-action between the room thermostat and the escapement unit as follows:—Water can escape from the central chamber of the escapement unit through a porous disc or an extremely minute orifice.

The rate of escapement varies according to the existing water pressure in the escapement unit, from no drippage to, for instance, 180 drops per minute at maximum pressure, but the rate of escapement at any given pressure will always be the same.

The thermostat valve is the inlet valve into the variable pressure tubing and the units connected thereto. These will hereafter be referred to as "the system". When exactly as many drops per minute are passed into the system by the thermostat valve as drip out at the escapement then the system will be in balance and the pressure will remain constant. But as soon as the thermostat valve moves toward closed position (in response to room temperature increase) the rate of flow into the system will be less than the rate of escapement, hence the pressure in the system will descend. In response to lowered pressure, the rate of escapement will reduce. This continues until the rate of escapement will again exactly balance the rate of flow into the system when the system will again be in balance and the pressure will remain constant.

Should the thermostat valve be moved toward open position by decreased room temperature, the rate of flow into the system will be increased above the rate of escapement and the pressure in the system as well as the rate of escapement will increase until the outflow again balances the rate of inflow.

The damper motors 600 and 600' will lift the dampers in proportion to the water pressure existing in the system thus increasing the draft of the furnace fire according to the volume of heat demanded by the thermostat. The damper motors operate in proper sequence first closing the upper or check damper 19 before opening of the draft inlet damper 17 begins. This is important in giving a wide and responsive range of draft control and will be later described.

The escapement unit drips water into drip cup 14. A tube 15 may lead this drippage into the evaporating pan of the furnace whether this evaporating pan is located at the top or near the bottom of the furnace. Water will thus be automatically supplied to the said pan to humidify the air which circulates to the rooms. The rate of drippage is proportional to the water pressure in the variable pressure system and this is proportional to the heat delivery demanded by the room thermostat. As more heat is demanded by the thermostat in colder weather than in mild weather, the rate of drippage will be proportional to the coldness of the weather. As most humidification is required in colder weather, my control system will not only automatically regulate the room temperature but will also automatically supply the proper amount of water required for air humidification, closely enough to requirements for all practical purposes.

The installation of my system is quite simple. The small tubing is easy to connect except that care must be taken that no dirt or grit is in the tubing. Should grit be left in the tubing it will lodge at the tiny thermostat valve 225. To make the system proof against this, the tube 2 is factory cleaned and permanently connected to the thermostat valve, and a small auxiliary filter or strainer 12 is permanently connected at the lower end of tube 2. Should grit be left in tube 1 it may be carried by the water stream no further than the strainer 12. The area of the screen or porous filter disc in the strainer 12 is large enough so that it cannot become clogged by any amount of grit likely to be left in the tubing leading thereto.

This auxiliary filter can also be employed as a resistor to reduce the rapidity of water pressure change in the variable pressure tubing system. This may be necessary in certain installations and in such cases a porous filter disc is inserted of such area and density as to limit the rate of water flow to the desired extent. The slowing up effect will be noticeable most at higher heat demand and results in a lower maximum pressure limit and a quicker drop of pressure from the maximum.

The addition of a resistance to the flow of water, said resistance being placed in the supply line to the thermostat, will limit the highest attainable heat demand by limiting the highest attainable water pressure. Obviously, the resistance may take the form of a restricted orifice or a needle valve.

Attention may now be called to certain features of my thermostatic control system which may aid in the comprehension of its underlying principles. Assuming my system as properly adjusted and in service, the thermometer reading represents existing room temperature and the temperature setting of the thermostat represents the desired room temperature. When these two are in agreement or balance, then the following items must of necessity also be in proportionate balance:—

The water pressure in the system is proportionate to the "thermal pressure" in the rooms or, in other words, to the degrees of room heating (above outdoor temperature) being accomplished.

The drops of water per minute flowing into the tubing system from the thermostat will be in proportionate balance with the therms of heat flowing from the central furnace into the rooms.

The drops of water escaping from the system per minute will be in proportionate balance with the therms per minute escaping from the rooms.

When the drops of water from the thermostat into the system exactly equal the rate of water escapement from the system, then the water pressure in the system will remain stationary and likewise:—When the therms per minute from the central furnace into the rooms exactly equals the rate of thermal escapement from the rooms, then the room temperature will remain stationary.

Whenever any of the paired factors referred to in the preceding six paragraphs become out of balance, then all others must of necessity become out of balance. The operating principle of my system is such that the minute any unbalanced condition occurs, means to correct it are immediately put into action.

My control system is in fact a miniature counterpart of the heating system in which the thermostat is the equivalent of the furnace; the water tubing equivalent to the heat ducts; the water flow to the heat flow; the damper motors to the rooms; the water pressure to the thermal pressure; the water escapement of the heat escapement, etc. The control system and the heating system are interconnected to control each other. In the above way, I accomplish completely modulated or metered heat delivery control.

The functions of the auxiliary thermostats 400, 400', and 400" will be explained. All these are of identical construction except for possible changes in the pitch of the dial screw thread and the dial graduations as will subsequently be explained. Each of these auxiliary thermostats contains a valve of graduated action and actuated by an expansion member which is in the form of a tube that is to be inserted into the top chamber of the furnace casing so as to be subjected to the effect of the existing temperature in said top chamber. The function performed by my auxiliary thermostat depends upon how it is connected.

When connected in series with the room thermostat as shown by auxiliary thermostat 400, it acts as a high heat limit control unit. Its dial may be set to, for instance, 300 degrees. At temperatures below this, its valve will be open so that the constant pressure supply water will flow freely through it but should the air within the casing top approach 300 degrees, the valve will begin to close and at for instance 303 degrees will be completely closed. Note that it will not suddenly shut down the furnace but will throttle the water passage to hold down the pressure in the tubing system to such extent that a higher temperature than its setting cannot be attained.

When an auxiliary thermostat is installed in parallel with the room thermostat as at 400' and its expansion stem is inserted into the furnace casing, it will act as a low heat limit control or a hold fire control. Its dial may be set as for instance 100 degrees or similar temperature below which there is danger of a coal fire dying out. At temperatures above its setting its valve will be closed tight and it will have no influence upon the control system. But should the room thermostat, due to warm weather or lowered night temperature setting, hold the fire in checked condition for so long a time that the interior temperature of the furnace casing drops down, approaching the set temperature of this thermostat, then its valve will be opened to admit as much water from the constant pressure tube 3 across to the variable pressure tube system as will be necessary to hold the set furnace casing temperature and hence prevent fire extinguishment or dying out of the fire to so low a point that it will be unable to again pick up as quickly as desired when the room thermostat demands more heat.

When an auxiliary thermostat is connected as at 400" it will act as a fire-out control. This is required only in the case of power stoked coal or oil fire. The expansion stem of the auxiliary thermostat may be inserted into the smoke pipe and set at a temperature which denotes that the fire has been extinguished. At temperatures above this, its valve will be closed tight. At temperatures below the set degree, its valve will open and drain the water and pressure from the variable pressure system through tubes 10 and 11. The valve of this thermostat should have a larger port than the room thermostat valve 225, and the valve of auxiliary thermostat 400' combined.

The auxiliary thermostats are desirable in many installations but not a necessity. Any one, two or all three may be employed. The room thermostat, auxiliary thermostats and escapement together constitute the pressure control units of my control system. The main inlet valve filter and pressure governor are the water supply units. The damper motors are the furnace operating units, but these may be replaced or augmented with hydraulically operated fuel valves or electric switches to control fuel supply or air blower motors as will be more fully described later.

Certain variations in the arrangement of the water circuit and relative arrangement of the various control units may be employed in my system without departing from certain of its operating principles. For instance, the auxiliary thermostat 400 will function as a high heat limit control if placed in tube line 5 or tube line 7. The damper motors 600 and 600' may be connected to tube line 5. Auxiliary thermostat 400" may be employed as located in Fig. 1 to function as a high heat limit control by merely adjusting it to actuate its valve at the high limit temperature and reversing its valve action so that it will remain closed at all temperatures below the set temperature. In that event it will open to drain out just enough water to reduce the pressure in the variable pressure system sufficiently to hold the furnace fire down to a safe limit.

Even more radical variations of the circuit may be made without departing from the essential principles of my heat control system. Fig. 35 diagrammatically illustrates one such arrangement. The water at city pressure enters the filter 50 at 85, then passes through the pressure governor 100 into the constant pressure line 1. A needle valve 25 or equivalent means acts as a restriction through which the water passes into the variable pressure tubing system 26, one branch of which is connected to the thermostatically controlled valve in the room thermostat 200. The outlet of this valve is connected to drain tube line 27 which drips into the cup 14.

The main change in this system over that shown in Fig. 1 is that the room thermostat 200 of Fig. 35 takes the place of the escapement 500 of Fig. 1 and the restriction 25 of Fig. 35 takes the place of the room thermostat 200 of Fig. 1.

The room thermostat in Fig. 35 has its action reversed so as to actuate its water valve toward closed position when more heat and hence more pressure in tubes 26 is demanded.

The auxiliary thermostat 400 limits the maximum temperature of the heat circulating medium of the furnace or boiler by opening when the intended maximum temperature is reached. This causes the pressure in tube lines 26 to decrease. It will not suddenly open, but as its set temperature is approached, it opens just enough to drain enough pressure from tube lines 26 into drain tube 27 to prevent the heat circulating medium of the furnace or boiler from exceeding the maximum temperature for which the auxiliary thermostat 400 is set. Normally, that is at all temperatures below its setting, the water valve of this thermostat will be closed. Note that the valve action of this auxiliary thermostat is reversed from that of the auxiliary thermostats in Fig. 1. This is accomplished by slight rearrangement of its levers.

Auxiliary thermostat 400' in Fig. 35 acts as a low heat limit control. In normal operation the valve of this thermostat is wide open. Its expanding stem is inserted into the smoke pipe of the furnace or into the heat circulating medium. When the temperature to which the expanding stem is exposed, drops down to a degree which denotes danger of the fire going out, then the valve of this auxiliary thermostat will be moved toward closed position enough to cause the pressure in tube lines 26 to be maintained at a high enough point to prevent extinguishment of the fire.

Auxiliary thermostat 400" acts as a safety fuel feed stop in event of fire extinguishment. It is desirable for mechanically stoked oil or coal fired heaters. Its expanding stem may be inserted into the vent gases or the heat circulating medium of the heater. The valve of this auxiliary thermostat will be closed at all times except when the temperature of its expanding stem gets down to a degree that denotes that the fire has extinguished, when it will open to drain pressure from tube line 26 sufficiently to cause all fuel feed to cease.

The room thermostat and the auxiliary thermostats in co-action with the restriction 25 constitute the control units for the water pressure in tube lines 26. The hydraulically actuated fuel valve 40 and electric switch 45 of Fig. 35 constitute the furnace operating units replacing the damper motors 600 and 600' of Fig. 1, because Fig. 35 shows my control system as applied to a gas fired warm air furnace with forced air circulation.

The valve 40 modulates the flow of gaseous fuel through pipe 42 which supplies fuel to the furnace burners. A diaphragm chamber in valve 40 is connected to tube line 26 by tube 26' so that the same hydraulic pressure exists in the said diaphragm chamber as in tube lines 26. The pressure existing in the diaphragm chamber will determine how much the gas valve is opened. The room thermostat translates heat demand into water pressure and the gas valve 40 translates water pressure into fuel volume delivery to the furnace. Details of construction of valve 40 are herewith elsewhere described and illustrated in Fig. 39.

The hydraulically actuated electric switch 45 is elsewhere described. 43 represents an electrical conduit leading to the switch and 44 represents an electrical conduit leading from the switch to a motor operating an air blower at the furnace. When the heat demand has risen to a predetermined point, the switch closes a circuit which causes the blower to operate at low speed. If the heat demand rises to a still higher point, another or a different circuit will be closed which will cause the blower to operate at higher speed. Successively higher and lower blower speeds can in this way be obtained—the blower speeds corresponding to the heat demand.

It will be evident that the switch 45 may be controlled by an auxiliary thermostat actuated by furnace bonnet temperature. In that case the blower speed will be controlled by the bonnet temperature instead of by the heat volume demanded by the room thermostat. It will furthermore be readily realized that certain combinations can be arranged so that a hydraulically actuated switch controlled by furnace bonnet temperature can be electrically connected in series with a heat demand controlled switch and the blower motor, so that both bonnet temperature and heat demand must reach a certain point to operate the air blower. Two such switches may also be connected in parallel to control the blower motor speed.

Tube line 41 leads to the safety pilot shown in Figs. 27, 28, 29 and 30. The said safety pilot will then act the same in general principle as the auxiliary thermostat 400''.

In Fig. 35 there is shown a timing device. This consists of a glass tube 31 clamped between top flange 33 and bottom flange 34 so as to be completely air tight. A tube 30 connects this timing device with variable pressure tube line 26. Normally the screws 36 and 37, which form valves, are closed tight and the valve 35 is open. Water from tube system 26 will then enter the bottom of the timing unit to level 38 compressing the air above more or less, according to the pressure existing in the system, the air space 32 acting as an air cushion. When the pressure in the system drops, the air cushion will press the water back into the system.

The object of the timing device is to increase the volume of water, and hence the time required, to raise the pressure in tube line 26 and the furnace control units, such as 40 and 45, connected thereto. Very little water is required to actuate control units 40 and 45 and as a result, in response to action of the thermostats, the pressure in tube system 26 may rise or drop too rapidly. The result will be fluctuations in room temperature. To overcome this, the valve 25 may be restricted more, but there is a practical limit to this remedy. The other remedy is to add the timing device 30. This adds to the volume of water required to flow into or out of tube line 26 in order to bring about a given change in pressure, hence it brings about slower increase or decrease in pressure in tube system 26.

To enable the above timing to be controlled, the valves 35, 36, and 37 may be manipulated to secure a larger or smaller air cushion space 32. By opening valve 37 air can be drawn out to reduce the volume of water per cycle required by the timing device. By closing the valve 35 and opening valves 36 and 37, more air can be admitted into the timing device.

The timing unit may be applied to the system shown by Fig. 1 as well as in other arrangements of my control system.

*Inlet water filter*

The separate control units of my control system will now be described in detail. Referring to Figs. 2, 3 and 4 which show the inlet water filter:—A base casting 51 is arranged to be clamped at one end securely to the water pipe 75 by means of U bolt 52 the threaded ends of which are entered in holes 53 and drawn up tight with the nuts shown. The upper portion of the base casting is arcuately recessed as shown in Fig. 3 and indicated at 54 Fig. 4, so as to contact the pipe 75 lengthwise at the upper edges of the said arcuate recess. The radius of the said arcuate portion is such that it will fit either one of the two most common water pipe diameters.

The recessed arcuate portion is centrally drilled and tapped to receive the threaded stem of the valve 80. The said valve stem has a central hollow projecting stem 81. A rubber or other yielding washer 82 is slipped over the stem 81. Before clamping the filter base to the pipe, a hole is drilled into the pipe to receive the stem 81. After the filter base is clamped securely in place, the valve 80 is screwed up tight. This compresses the washer 82 tightly against the outer wall of the pipe and of the stem 81 to easily make a perfectly water tight connection.

The drilled cross holes 83 serve as an entry for the water into the longitudinal bore of the stem 81 and communicates with the water passage through the valve.

The other end of the base casting 81 is recessed and threaded to receive the filter barrel 55. The inlet 56 is adapted to connect to a tube 57 which is connected to the outlet end of the valve 80. Water passes from this tube through inlet port 58 into the filter tube chamber 59. This contains a porous filter tube 60 held in place by flanged screw 61 as shown, washers 62 and 63 as well as central guide bosses 64 and 65, being provided for the purpose of assuring a proper seating of the filter tube at each end. The water, after passing through the walls of the filter tube, passes upwardly through ports 66 and 67, the latter being tapped to receive the pressure governor. The base casting serves as a strong support for the entire mechanism including the pressure governor, filter, valve and connection into the water pipe. This simplifies installation.

The proper filtration of the water supplied for my hydraulic thermo-control system is an important element for assuring successful operation. If the water is not filtered, clogging troubles will be encountered. If the filter tube will not remove even microscopic particles, such as iron oxide from the water, these will then clot at fine passages such as at the thermostat valve seat. It is preferable to employ a porous ceramic filter tube of necessary fineness of the pores, yet offering small resistance to the low rate of water flow which is employed.

Of next importance is the longest possible period of use of the filter tube so that too frequent replacement will not be necessary. To retard clogging of the filter tube, the outer surface of the tube is made of a more coarsely porous material secured, for instance, by wrapping the tube externally with filter paper of proper density. This will collect the coarser floating particles for a greater depth of penetration before clogging. The inner tube will then collect, not only small particles of the filter paper, but also any particles which get through the filter paper. The outer wrapping or more coarse portion of the filter tube is shown at 68.

Water pressure governor

Of next importance to supplying perfectly clear water for the operation of my hydraulic thermo-control system is to supply the water at a uniform pressure which never exceeds the maximum pressure intended to actuate the hydraulically controlled dampers, valves and electric switches.

Referring to Figs. 5, 6, 7 and 8; 101 is the body of my pressure governor. A flexible diaphragm 102 is clamped between the inlet flange 103 and one end face of the body 101. Another similar flexible diaphragm 104 is clamped between the outlet flange 105 and the other end face of the body 101, both flanges being drawn up to a water tight peripheral fit by screws as shown.

The body 101 has a transverse opening 106 near the outlet end and this end is axially drilled to fit the piston like flange 107 of the pressure control plunger 108. An axial threaded counterbore 109 extends from the transverse opening 106 to within a short distance from the inlet and leaving a shoulder 110. A small central hole extends from this shoulder through to the inlet end of the body 101 and serves as a guide for the shouldered projection 111 of the plunger 108. The middle shank 112 of this plunger is passed through a compression spring 113, one end of which bears against the inner end of plunger flange 107 and the other end is seated at the bottom of the central recess in adjustment gland 114 which is threaded to enter the threaded counterbore 109. 115 is a lock nut for the adjustment gland.

The spring normally presses the plunger against the flexible diaphragm 104, deflecting it outwardly until it rests against the stop 116 in annular recess 117 of the outlet flange 105.

Figure 7:
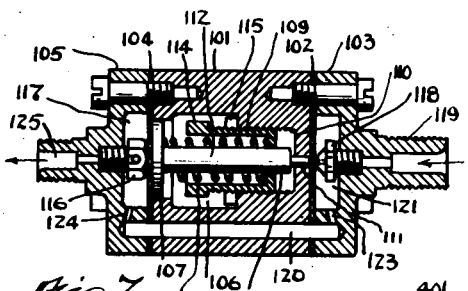

The inlet flange 103 is similarly recessed and contains an axial removable valve seat 118 screwed in place as shown in Fig. 7 in axial alignment with the plunger and the inlet hub 119 which is externally threaded and axially drilled to form an inlet passage which extends through the valve seat 118.

A longitudinal port 120 places the recess 121 of the inlet flange in communication with recess 117 in the outlet flange with the aid of the diagonal drilled ports 123 and 124. The outlet flange 105 has a central extended boss which is threaded and adapted for connection to a pipe or tube. The stop 116 is cross drilled to establish communication with the outlet port 125 which extends through the center of the stop 116.

Figure 5:
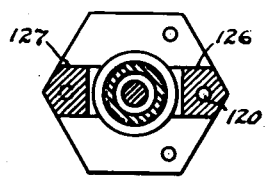

The transverse general outline of this pressure governor is hexagonal, the three clamp bolts at each end being located in alternate apexes as shown in Fig. 5. The longitudinal passage 120 is located in an intermediate apex of the hexagon. This results in a neat form for the governor, ample diaphragm material around the bolt holes and longitudinal passage, with minimum required metal. The hexagonal transverse outline of the governor adds another important advantage in that a wrench may be applied to screw the governor tightly into the fitting which is to receive it, in this case, the filter.

The governor is especially adapted to handle the small water flow required by my hydraulic control system and to closely regulate the outlet pressure. Operation is as follows:—The water enters the inlet port and passes out of the valve seat port (.035" diameter) through the chamber 121, ports 123, 120 and 124 into the outlet chamber 117 through the stop 116 and outlet passage into the tube system to which it is connected. As soon as sufficient pressure is generated in the outlet chamber 117 to press the diaphragm 104 against the plunger and overcome the pressure of the spring 113, the plunger is moved toward the inlet valve seat, and the small extension 111 of the plunger deflects the central portion of the inlet diaphragm 102 to contact the valve seat 118 and close it if necessary, or throttle the water flow down to the exact extent to maintain the intended constant outlet pressure. The exact outlet pressure which is maintained depends upon the force exerted by the spring 113 and this may be adjusted by means of the threaded adjustment gland 114 as will be obvious. 115 is a lock nut to lock the adjustment gland in place after satisfactory adjustment has been made.

Note that the inlet valve of the governor is closed "against" the water flow which insures smooth action. The maximum opening between the valve seat and diaphragm 102 is only a few thousandths of an inch. In regulating the outlet pressure, the movement of the plunger is normally less than a ten thousandth of an inch. Dimensions are cited to give an idea of the refinement of operation which must be accomplished in the service for which the governor is designed.

In order to accurately control the outlet pressure, the diaphragms must be very thin. Note that the design is such that the diaphragms are placed under no stress except direct hydraulic compression. To prevent possibility of the small end of the plunger pressing the flexible diaphragm 102 so tightly against the valve seat as to damage the diaphragm, the shoulder of the mid stem 112 of the plunger comes against the shoulder 110 when the diaphragm has been compressed sufficiently to close the valve. The stop 116 prevents possibility of the plunger being moved back far enough by the spring to partially vacate the guide hole 111 so that the center of the diaphragm 102 can be forced into the guide hole and stick there.

Figure 6:
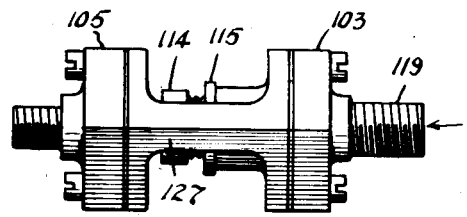
Figure 8:
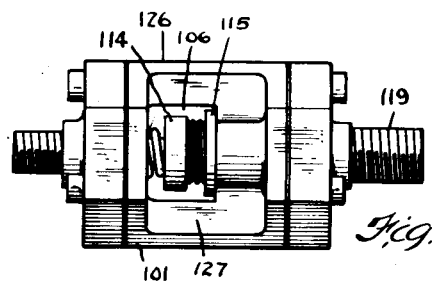
Figure 9:
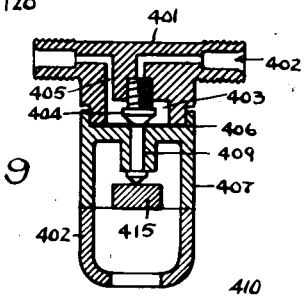
Figure 10:
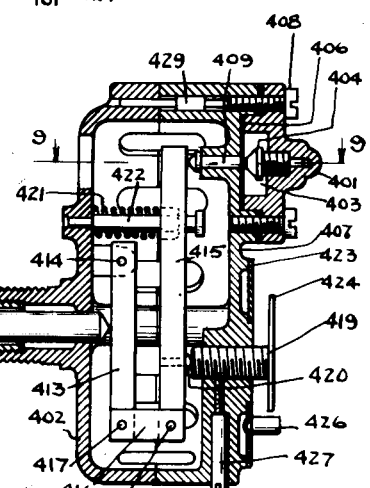
Figure 11:
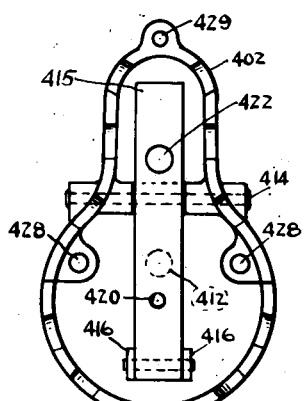
Figure 12:
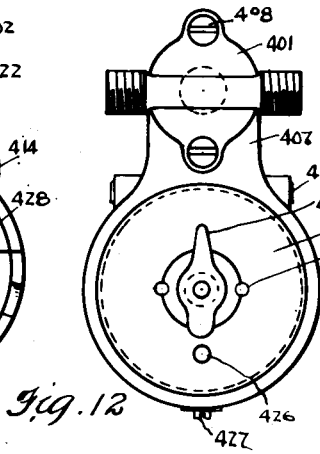

Fig. 6 shows how the middle part 101 of the governor is cut away to provide access to the adjustment gland and lock nut. Fig. 8 shows that the governor consists of two diaphragm chambers connected by two pillars 126 and 127 one of which pillars is bored to form the communicating passage 120, one of which diaphragm chambers contains the valve and the other supplying the valve actuating power. The valve seat 118, being subject to water wear, is replaceable.

The provision for adjustment of the outlet pressure is important. It enables the unavoidable variation in the compressive force of various springs to be adjusted; it enables changes in spring temper, brought about by time, to be adjusted, and it enables a final adjustment to be made in each separate installation so that the pressure governor may be adjusted to limit the highest hydraulic pressure obtainable in the control system to the maximum ever required to completely open the draft or fuel supply. If maximum hydraulic pressure is permitted to occur in the control system which is higher than necessary to set the furnace to deliver maximum heat volume, then the quickness of the response of the control system to demands for somewhat less than maximum heat by the room thermostat would be impaired. For instance, suppose that a maximum water pressure of 25 pounds per square inch is ample to turn on full heat but the pressure governor would permit a maximum of 35 pounds per square inch to be attained in the control system. Then every time that demand for somewhat less than maximum heat supply is demanded by the thermostat after maximum demand has existed for some time, then no change of setting of the furnace dampers or valves will occur until the pressure in the control system has dropped from the 35 pound maximum to a heat delivery requirement that is supplied at for instance 22 pounds hydraulic pressure. During the major portion of the period during which the pressure is dropping from 35 pounds down to 22 pounds, no reduction in the heat volume delivered into the rooms would occur. This might delay the reduction of pressure by 10 minutes or so, during which the room temperature might "overshoot".

In case of an over size furnace, the maximum attainable heat demand may also be reduced by adjusting the governor to supply water at lower pressure.

The importance of an adjustable pressure governor as an essential part of my control system may thus be appreciated.

Room thermostat

The room thermostat, shown by Figs. 13 to 18 inclusive will now be described:

The room thermostat is really a tiny water valve controlled by thermo-expansion mechanism which is actuated by the room temperature. The thermo-expansion mechanism is mounted upon a base 201. An outer casing 202 fits over the base being held in place by clamp devices not shown. A hollow extension 203 projects outwardly from the base and carries the water valve at its end. This thermostat is intended for mounting upon a partition wall of a room. To mount it in place a hole is drilled through the lath and plaster 204 and the extension 203 is inserted. The tubing to and from the thermostat valve will come up to the valve in the studding space of the wall.

The base 201 contains three bosses 240 projecting slightly beyond the bottom of the base and centrally cored to receive screws for screwing the base to the wall. No portion of the base touches the wall except these three bosses. This three point mounting prevents any possibility of the base being twisted or warped and also, by reducing wall contact, the conduction of warmth from the base to the wall or vice versa will be reduced. A flat rectangular piece of metal is bent upward at each end as shown at 205 Fig. 16 to form a holder for two banks of thermostatic bi-metal blades 206 Figs. 14, 15, 16 and 17. Each bank contains preferably three of these blades. Each of the blades contains a projecting lip 207 (Figs. 14 and 18) at each end. These lips laterally fit a series of rectangular slots 208 (Fig. 18). On the inner side of the bent up portion of the holder 205 is a latch plate, the outline of which is shown in dotted lines at 209, Fig. 18. This latch plate also contains a series of spaced rectangular holes 210, through which the lips 207 of the bi-metal blades project. Shoulders on the bi-metal blades 206 hold the latch blades in place against the bent up portions of the blade holder. An opening 211 is provided in both the bent up portions of the blade holder 205 and the latch plate 209 to receive coil compression springs 212 which are adapted to push the latch plates upwardly so that the lip 207 of each bi-metal blade is pressed upwardly against the top surfaces of the rectangular slots 208 by the bottom surfaces of the slots 210. The springs are strong enough to take up any slight difference in curvature between the bi-metal blades yet the blades are not rigidly held at their ends and they are free to bend under influence of temperature changes.

An adjustment-screw holder 213 is centrally carried by the bi-metal blades. This holder has two lateral arms 214 (Figs. 14 and 17) which extend between two upper bi-metal blades. Separators 215 are placed between the two lower blades and a bolt 216 is passed through and drawn up tight. The temperature adjustment-screw 217 is threaded through an extended central boss 213' of the adjustment screw holder 213. The bottom of this screw is turned off flat at right angles to its axis.

The bi-metal holder 205 rests at one end upon the apex of two transverse triangular projections 218 (Figs. 16 and 18). A shouldered bolt 219 is passed through a hole in the bottom of the blade holder and bolted to the base as shown in Fig. 15. A spring 219' seated against the head of the bolt presses the blade holder against the apex of the triangular projections 218. This bolt 219 also holds the blade holder in alignment. Another shouldered bolt 220 is passed through a longitudinal slot in the bottom of the blade holder 205 and is bolted to the base as shown. A compression spring 221 is seated at the bottom of an annular recess in which the bolt is located, and this spring presses the bi-metal blade holder upward against the head of the bolt 220. This bolt also holds the blade holder 205 in lateral alignment.

The above means for securing the blade holder in proper parallel relationship gives it a three point support which prevents possible distortion of the blade holder which, if occurring, might prevent the free and accurate flexure of the bi-metal blades. The spacing between the bi-metal blades at each end and at the middle of the blades will under all circumstances be uniformly held. Under flexure, the bi-metal blades act as a parallel motion mechanism. The axis of the adjustment screw 217 is always retained at right angles to the bi-metal blade holder when moved axially by flexure of the bi-metal blades. The flat bottom of the adjustment screw bears against the valve operating plunger 222 which is guided at its upper end by being passed through a free-fitting hole in the bottom of the blade holder. The lower end of the plunger is entered in a guide-hole in the flanged plug 223, which is screwed or press-fitted into the bottom of the extension 203 of the base, see Fig. 15. A thin flexible diaphragm 224 is peripherally clamped between the flat bottom face of the base extension and the valve body 225 by the interiorally flanged nut 226.

The valve body is counter-bored at 227 as shown and an axially disposed valve seat holder 228 is screwed into a tapped recess at the bottom of said counterbore. This valve seat holder fits tightly against the bottom of the counter-bore to make a water-tight joint and is axially drilled. A jewel valve seat is spun in place at its outer end and this because of its hardness cannot be scored by water-wear.

Referring to Fig. 17, the water enters the central port to which the tube 2 is connected and passes through the valve-seat into the annular chamber 227 from where it passes out through the port 229 to which the outlet tube 5 is connected. The other port 230 connects with tube 6 which is connected to an elbow screwed into the water inlet 232 of the pressure gauge 235.

The diaphragm 224 of the thermostat valve is pressed by the water pressure in space 227 against the flat face of the extension 203. It is therefore not exposed to any other strain than direct transverse compression. The valve stem can be pressed toward the valve seat no further than is permitted by the collar 236 which at maximum downward stroke engages the upper face of the flanged plug 223. When thus pressed down to its limit, the valve plunger presses the central portion of the diaphragm against the valve seat and compresses the diaphragm at this point sufficiently to close the valve as much as is necessary but cannot bring more pressure to bear because its downward stroke is limited by the collar 236. The central bore of the plug 223 is slightly tapered to larger diameter toward the left hand end (as shown in Fig. 15) so the plunger 222 cannot bind, in case the upper guide hole in the bi-metal blade-holder 205 does not happen to be accurately aligned.

The bi-metal blades 206 are made of two laminae of different metals having different thermal expansion. That side of the blades having highest expansion is placed downward, toward the base. The result is that when the blades become warmer they curve toward the valve. For each temperature, the blades assume a certain curvature which is always exactly the same for the same temperature. As these blades carry the adjustment screw, the flat end of this screw will have a certain definite distance from the valve for every temperature unless the screw is turned down or up from its original position. The exact room temperature at which the valve will be closed to a certain extent depends upon how far the screw is turned down.

The longitudinal advancement of the screw obtained by one revolution is sufficient to cause the thermostat to maintain any room temperature required. A dial 237 graduated in temperature degrees is provided together with a knob 238 for the screw 213, said knob having a pointer 239 which indicates the temperature for which the screw is set.

To enable the dial to remain close to the knob and its pointer so that the set temperature can be clearly seen, the dial has a central bore through which the temperature adjustment screw is passed. A conical spring 241 presses the dial against the bottom face of the knob as shown, so that the dial rides on the said screw and follows the longitudinal movement of the knob. To keep the dial from turning and to enable its position to be adjusted so as to properly indicate the temperature being maintained, a lock arm 242 is provided. This is bored and threaded to fit a thread upon the external circumference of the boss 213'. This lock arm is also slotted as indicated in Figures 15 and 17 and drilled at right angles to receive shouldered screw 243 which screws into the hole in the lower arm only, so that when the screw 243, Fig. 17, is screwed down, it draws the upper portion of the arm 242 down toward the lower portion. This clamps the arm 242 tightly to the thread of boss 213' so that its rotative position is securely held. The upper end of this shoulder screw 243 passes through a hole in the dial so that it prevents the dial from rotating. A third purpose is served by the shoulder screw in that it projects above the dial and acts as a limit pin to limit the rotation of the knob to a single revolution by engaging the pointer of the knob at each end of its arc of permitted movement (see Fig. 13).

The dial is adjusted so that the temperature actually being maintained will be correctly indicated by simply loosening the screw 243, then using it as a handle to rotate the dial and lock arm (without moving the temperature adjustment screw) until the temperature registration is correct. The screw 243 is then tightened again, which locks the dial and lock arm securely in place.

Final dial adjustment, on the job, should be made in average winter weather, for instance, 35 degree weather. In weather that is 35 degrees colder than average, the dial indication will then be about one degree higher than the temperature that will actually be maintained. The reason for this is that, in average winter weather, the thermostat valve will be opened approximately half way in order to maintain the set temperature but in colder weather the valve must be opened wider in order to cause enough hydraulic pressure in the system to warm the room to the set temperature. My thermostat may be arranged so that this inaccuracy, which is a necessity in modulating temperature control, can be held down to a small fraction of a degree if desired. However, I deem accuracy within 1 degree for zero weather amply accurate for practical use.

The knob of the temperature adjustment screw is secured to the screw by means of a knob hold screw 244 as shown in Fig. 15. This enables the knob pointer to be adjusted in such position that when the dial is adjusted, the highest temperature ordinarily maintained will appear at the highest portion of the dial, so that the owner will move the pointer upward for higher temperature and downward for lower temperature. This prevents confusion.

A thermometer, composed of a coil of bi-metallic metal 245, Fig. 15, is mounted within the casing cover 202. The end of the innermost turn of the coil is bent at right angles across the center point of the coil and passed through a central longitudinal slot in the central bolt 246. This bolt has a shoulder which presses the cross bent portion of the coil against the boss 247 projecting downwardly from the casing cover, when the nut 248 is drawn up tight. The terminal of the outermost coil is bent to project outward radially to form a pointer 249. The thickness, length and quality of the bi-metal composing this coil is such that it will coil or uncoil under influence of changing temperature to the extent shown by the graduated scale 280 in the outer face of the casing 202 adjacent the arcuate slot 251 through which the thermometer index 249 will be visible, the latter being preferably enameled white.

The thermometer is adjusted to correctly indicate the temperature of the coil by loosening the nut 248 sufficiently to permit the slotted bolt 246 to be rotated. This also rotates the entire bi-metal coil. When correct temperature is indicated, the nut is tightened.

It is to be noted that the thermometer coil is located inside the casing of the thermostat in close proximity to the bi-metal blades 206. It is therefore exposed to substantially the same temperature influence. Because both the blades 206 and the thermometer coil are of bi-metal, exposing a large surface, both will respond to temperature change at equal quickness, and both will therefore always be in step. This could not be possible where a mercury thermometer, located externally of the casing cover, in the conventional manner, was employed. This equalization of both thermometer and expansion mechanism is of great importance in a thermostat for a graduating thermo-control system. Because the bi-metal in the thermometer coil must be thinner than the bi-metal in the valve actuating blades 206, I wind the coils closer together so that their otherwise quicker response to air temperature change is reduced to be in step with the response of the blades 206.

The pressure gauge 235 is of common type having an inlet stem 253 at the back and a pointer 254 to indicate the water pressure existing in the variable pressure tubing system to which it is connected. The stem 253 is inserted in a fitted hole in the base 201 and secured with set screw 255, or otherwise. The movable end of the indicator 254 is visible through the arcuate slot 256, which is graduated. However, instead of graduating this dial in pounds of water pressure, it is graduated to show the equivalent of the water pressure in tenths of full heat-delivery capacity of the central heater, which is the information desired to be shown.

This pressure gauge is an extremely important adjunct of a main thermostat. If the indicator is at the extreme left, the room owner sees at a glance that no heat is turned on. If the indicator is at any other point, the owner can at once see relatively how much gas or oil fuel is turned on, or, if he has a coal fired central heater, what proportion of maximum rate of combustion is demanded by the damper setting.

The pressure gauge, in conjunction with the temperature demand dial setting and the thermometer dial will tell the owner when a coal fire requires refueling or other attention. Suppose he notes a temperature demand dial setting of 75 degrees, but the thermometer dial indicates for instance 73 degrees. The owner at once knows that something is wrong. If the heat demand dial shows that maximum draft is turned on, then he is informed that the furnace fire is unable to supply the demanded heat volume even with the draft wide open. The obvious remedy is to add more fuel to the fire, shake down ashes or stir up the fuel bed, as the case may be.

The heat demand dial also shows the owner how quickly the rate of demanded heat flow will be increased or decreased by an almost microscopic rotation of the temperature demand knob, or by blowing warm breath into the thermostat blades.

Still another use of the heat demand dial is in making a tentative adjustment of the temperature demand dial. The knob 238 is turned until the heat demand dial indicates a proportionate heat volume demand that is approximately correct for existing room temperature and outdoor weather. When the knob 238 is adjusted to a point which will steadily hold the heat demand indicator 254 at the said approximately correct heat demand point, the dial 237 is adjusted to indicate the existing room temperature. Adjustment of the dial 237 can usually be made accurate within 1 degree. Final adjustment will then be merely a matter of slight correction during continuous operation in average winter weather.

I shall now describe my method for automatically turning the room temperature demand of the main thermostat down to a lower degree during the night and up again in the morning:—

Referring to Figs. 14, 15 and 16, a pair of bi-metal strips 260 are rigidly held at one end by screw bolts 261 passed through rectangular dielectric spacers 262 and the thermostat base 201 which is also a non-conductor. The said bi-metal strips are insulated from the said screw bolts with mica washers. The upper nuts 263 are drawn up tight and the lower nuts 264 serve as binding nuts for wire terminals.

The bi-metal strips 260 are connected together by cross strip 265 riveted to the said bi-metal strips at 266. The remainder of the bi-metal strips is wrapped with a thin ribbon of insulating mica composition or the like, over which resistance wire 277 is wound, one terminal of which is secured to one of the screw bolts 261 and the other is secured to the other screw bolt. The outer terminals of each resistance wire coil are connected by cross wire 267. Current of preferably 18 to 20 volts enters one terminal screw 261, passes through the resistance wire wrapping of one bi-metal strip, then across connection 267, and through the resistance wire wrapping of the other bi-metal strip, and out at the other terminal screw. The two terminal screws mentioned are then connected to a wiring circuit originating from some such source as a transformer, said circuit being turned on or off by a clock mechanism at predetermined time intervals.

When the said circuit is opened by the clock the current through the resistance wire warms the bi-metal strips 260 about 60 degrees above room temperature. The bi-metal strips are adapted to bend downward at their free ends which carry the cross strip 265 which is preferably made of a material such as mica that is stiff and does not readily transmit heat. This cross strip has a downwardly projecting lug 268 which is entered into a rectangular opening 269 (Fig. 18), in the end of the bi-metal blade holder 205. When the bi-metal strips 260 bend downward as described they move the adjacent end of the blade holder downward against the upward thrust of compression spring 221. It will be remembered that the blade holder is held in constant engagement with the transverse knife edge bearings 218 by spring 219', so that it pivots at this point. When the blade holder 205 including the entire expansion mechanism carried by the blade holder is thus tilted downward at the upper end, the plunger 222 is pushed downward, moving the valve toward closed position. This is equivalent to adjusting the screw 217 downward toward a lower temperature.

The distance which the thermo-motive valve plunger operating mechanism is thus tilted downward is limited by night-temperature adjustment screw 270. The shank portion of this screw passes through a slot 271 in the blade holder as shown. The threaded portion which is entered in a tapped hole in the thermostat base is of larger diameter than the slot and the shoulder thus formed limits the distance that this end of the blade holder 205 can be moved by the bi-metal strips 260.

The upper end of the night temperature adjustment screw has a pointer 272 which is visible through slot 273 of the cover. A suitable knurled handle 274 projects through the cover 202. Stop pins 275 are located in the path of the pointer to limit the arc of rotation of the screw 270. The face of the cover 202 is graduated in temperature degrees at 276 to show how many degrees the night temperature maintained by the thermostat will be turned downward.

Operation of the night-turn-down mechanism is as follows:—The operator turns the pointer 272 to the degrees of night temperature reduction, below the daytime setting, which is desired. At a predetermined hour, the clock causes a contact to be made to close the circuit which flows through the resistance wire 277. This warms the bi-metal strips 260 which deflects the thermomotive valve actuating mechanism downward as far as the shoulder of screw 270 permits. This results in a room temperature being maintained which is as many degrees below the setting of the dial as is indicated by the night-turn-down dial 272. In the morning at another predetermined hour, the clock breaks the night-circuit and the bi-metal strips 260 resume room temperature and in so doing bend upwardly, permitting the spring 221 to restore the thermo-motive valve operating mechanism to its normal position, in contact with the bottom of the head of screw 220.

Should the owner desire to maintain day temperature beyond the predetermined night turn-down hour, he can merely set the night turn-down dial to zero in which case the shoulder of screw 270 will prevent the thermo-motive valve operating mechanism from being pressed downward by the bi-metal strips 260. The above described means for automatically turning the maintained temperature down at night can easily be employed to maintain three different stages of room temperature. In such case the householder upon retiring can set the main dial 239 to desired morning temperature, for instance, 65 degrees. He then sets the night temperature dial 272 for a lowering of 5 degrees below this, which will give him 60 degrees night temperature. In the morning, the maintained temperature will automatically be shifted to 65 degrees, and then, for an afternoon party or toward evening the main dial can be shifted to, for instance, 72 degrees.

The bi-metal strips 260 are located above, and as far from, the bi-metal blades 206 as possible, so that the warming of the strips will not warm other parts of the thermostat to a point which will influence the bi-metal blades 206 to any material extent. The strips 260 are of such proportions that only moderate warming is necessary to produce the necessary deflection. The tendency will be for these strips to produce an upward air current when warmed. The warmed strips 260, being located above the bi-metal blades, caused the induced air current to draw air at room temperature through the blades 206 which then flows over the warmed strips 260, and upwardly, out of the thermostat case. This tends to nullify the tendency of warmth from the strips being conducted downwardly to influence the deflection of the blades 206.

Referring to Fig. 15, the thermostat base and cover are made of a molded material of low heat conductivity and heat holding capacity such as Bakelite. This material is as thin as is consistent with necessary stiffness and strength. The above enables these parts 201 and 202 to quickly respond to temperature change of adjacent air. Were these parts made of heavy metal, they would be very slow in assuming the temperature of the air when this changes and they would therefore retard temperature changes in the bi-metal blades 206. For the same reason, the blade holder 205 is made as thin as considerations of strength permit, which is substantially the same metal thickness as the blades 206, so that it will respond with equal rapidity to temperature changes as the blades.

The base 201 contacts the wall at only three points so wall temperature is not readily transmitted to the base by conduction. There is an air space between the wall and the base and another between the base and the blade holder, and still another air space between the blade holder and the lowest blade. The influence of wall temperature is therefore eliminated from the bi-metal blades except insofar as the wall temperature influences the temperature of the air in the vicinity of the bi-metal blades.

The hollow extension 203 places the water valve at sufficient distance from the main portion of the base so that the influence of cold water circulating through the valve cannot reduce the temperature of the thermostat base to any detrimental extent.

*Water escapement unit*

Figure 34:
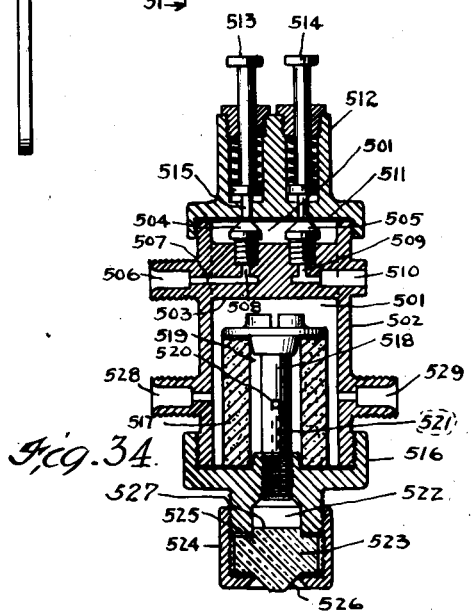
Fig. 34 is a vertical sectional view of the water escapement unit upon its central plane.

The water escapement unit will now be described: Referring to Fig. 34, a central water pressure chamber 501 is formed by the housing 502. This contains a cross bar 503 near the top for the purpose of holding valve seats 504 and 505. The inlet boss 506 is adapted to receive the by-pass tube line 5 (see Fig. 1). Water can enter through passages 507 and 508 and then through the valve seat 504. The valve seat 505, passages 509 and 510 furnish an outlet into drain tube 13 (see Fig. 1). A flexible diaphragm 511 is peripherally clamped by the top casting 512 which is screwed on to the housing 502.

Valve plungers 513 and 514 are pressed downward by springs as shown. The lower ends of these plungers press the diaphragm against the valve seats and when either one of these plungers are manually lifted, sufficient clearance exists for water to pass. Pulling plunger 513 admits water into the central chamber 501 and pulling plunger 514 exhausts water from the central chamber.

The lower end of the housing is closed by bottom cap 516 screwed on as shown. A porous tubular filter tube 517 is securely held down in place as shown by flanged screw 518. Washers as shown insure that no water can enter chamber 519 inside the tube, except by passing through the walls of the said filter. The flanged bolt 518 is cross drilled at 520 and another passage 521 is drilled upward from the bottom end of the bolt to communicate with said cross passage. These passages furnish an exit for the water from the chamber 519 into outlet chamber 522. A porous resistance disc 523 is clamped in place as shown by nut 524 between washers 525. The nut 524 is centrally bored at the bottom to clear a conical extension 526 of the resistance disc. The outer surface of this disc is either glazed or has its outer pores filled with some compound to close the outer pores. The upper flat surface 527 of the disc is then ground down through the glazing or water proofing and the apex of the conical bottom projection is also ground off as shown in Fig. 34. Water can then enter this disc only at the ground top surface 527 and then can escape only at the ground off portion at the bottom. The resistance disc then acts as a resistance for the escape of water from the central chamber. The area of the bottom ground off portion determines the rate at which water shall escape from the central chamber, at any given pressure.

The drilled and threaded stub 528 is adapted to connect to tube line 5 and similarly drilled and threaded stub 529 is adapted to connect to tube line 7 all as shown in Fig. 1. The outlet filter 517 insures that any salts or grit occurring in the tubing system or chamber 501 cannot reach the resistance disc to clog it. The resistance to escape of water through the resistance disc will therefore remain constant.

The vital function accomplished by the escapement unit 500 is to permit water to escape from the system against predetermined resistance to escapement. The resistance may be a single restricted port or a multiplicity of ports as represented by the resistance disc 523. If escapement is through a single port, the said port must be so small as to be almost microscopic and this is impractical. Furthermore, such an extremely small port may enlarge by water-wear, and it may easily and suddenly clog as for instance by a particle detaching from the filter 517.

The difficulty of drilling a fine enough escapement port may be overcome by employing a valved outlet port. In this case the disadvantages of a single escapement port remain. The fact that a valved escapement port may be re-adjusted is of questionable advantage for general use because it cannot be assumed that the average householder will be able to re-adjust the valve from time to time or that he will refrain from tampering with the valve. In the vent that the escapement resistance is or becomes altered the temperature maintained by the room thermostat will be altered.

For the foregoing reasons I prefer to employ the resistance disc construction shown by Fig. 34. Among the advantages are: if clogging occurs it is extremely gradual because the top area of the disc in chamber 522 is several thousand times as great as that of a single port of equivalent resistance; the resistance can be factory determined, hence will be proof against unskillful adjustment; if the rate of drippage alters sufficiently to impair more accurate room temperature maintenance, the disc may be replaced; if a faster rate of water flow is desired (for instance to supply more moisture to an evaporating pan) the resistance disc may be replaced by another factory tested and rated disc which will pass the desired volume of water.

It is to be noted that inasmuch as the outlet filter 517 presents a much greater wall area to the water than the resistance disc, the former will be much more effective as a filter and that any floating particles so minute as to pass the outlet filter will easily pass through the resistance disc, assuming that both possess the same porosity, which is provided. Both the outlet filter and resistance disc are constructed of identical material.

*Damper motor*

The damper motor will now be described:—

Figure 31:
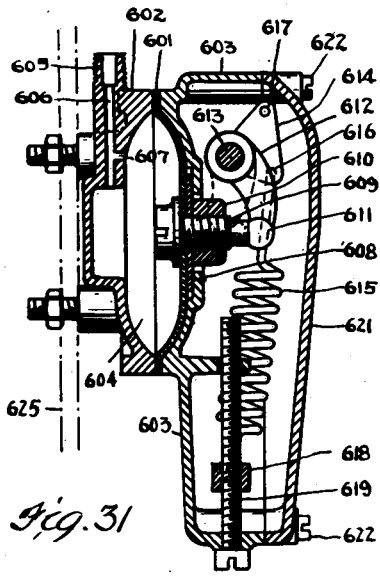
Fig. 31 is a longitudinal section of the damper operating motor on line 31—31 of Fig. 32 which is a plan view with the cover removed.
Figure 32:
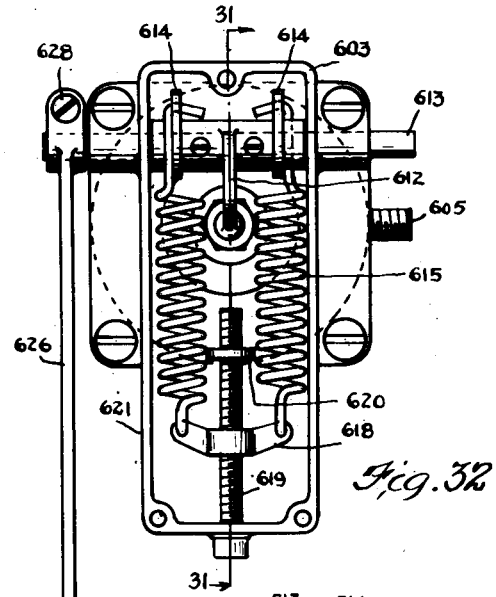
Figure 33:
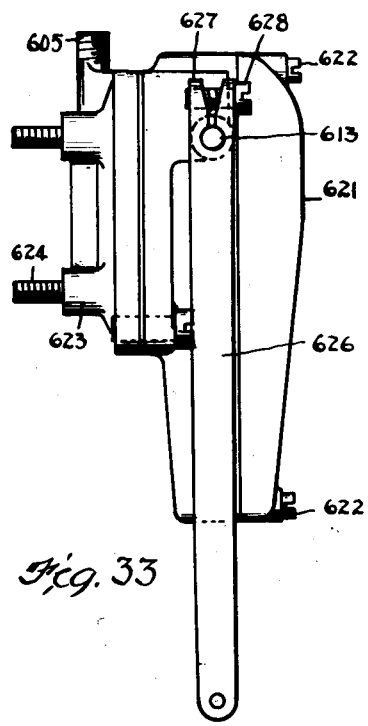
Fig. 33 is a side elevation of the damper operating motor.

Referring to Fig. 31, a strong flexible diaphragm 601 is peripherally clamped between base casting 602 and middle housing casting 603, these forming water pressure chamber 604. The threaded stub 605 is adapted to connect to a water tube, such as line 7, for example. Water passes through passages 606 and 607 into the said water pressure chamber. A stiff washer 608 is securely clamped to the center of the diaphragm by means of bolt 609 and nut 610. The outer end of this bolt is concave to be held in alignment by a ball 611 cast on the end of lever casting 612. This casting has an elongated hub which is bored to receive rock shaft 613 which is keyed to the lever casting by means of pointed set screws or otherwise. The lever casting also has two integral flat spring anchor levers 614. Each of these levers contains two or more cross holes to serve as anchorages for springs 615. Preferably two spring anchor holes are adequate, in each spring anchor lever; one 616 located nearest the spring end of the mechanism and at shorter radial distance from the rock shaft than the other spring anchor hole 617 which is located at greater radial distance from the rock shaft and furthest removed from the spring mechanism.

The opposite ends of the springs 615 are anchored in a cross bar 618 which is centrally bored and tapped to receive spring tension adjustment screw 619 which is passed through a hole at the end of the extension of the housing 603, and through a guide hole in lug 620. Turning this screw increases or decreases the spring tension by moving the spring anchor yoke 618. When the diaphragm is pressed to the right, as shown in Fig. 31, by the water pressure in the water pressure chamber 604, the lever casting and rock shaft will be rotated counter-clockwise to the position shown, against the tension of the springs 615. A cover 621 encloses and protects the mechanism, being held in place by screws 622.

Four equally spaced bosses 623 and bolts 624 serve to secure the damper motor to the ash door 625 or elsewhere. The rock shaft 613 projects beyond each side of the housing through bearing holes on each side of housing 603 as shown. A damper operating arm 626 may be clamped as shown on either projecting end of the rock shaft at any desired angle. The projecting ends of the rock shaft are knurled to enable the clamp arrangement 627 of the lever to secure a firm grip upon the shaft when screw 628 is tightened.

Referring back to the installation of two damper motors shown in Fig. 1: The lower damper motor 600 is bolted to the ash door 16 and its lever so secured to the rock shaft that it will lift the inlet draft damper 17 by contacting and lifting the arm 18 which usually projects from ash door dampers toward the hinged side of the ash door. A flexible tube connection 8' is provided so that the ash door may be swung open. This connection 8' is preferably looped to provide ample length of flexible tubing to take the torque upon opening the ash door without undue strain upon the tubing. Of course the damper motor could be mounted upon the ceiling and a chain or rod be connected from the end of the damper motor lever to lift the damper.

The other damper motor 600' may directly operate the check draft damper 19 by turning check damper frame 21 upside-down from its usual position so that the damper will pivot at the bottom as at 20. The damper motor in such case is preferably bolted to an extension 23 of the damper frame 21, so placed that the pivot point of the damper motor lever 626 will be as close to the pivot point 20 of the damper 19, in fact closer than shown by Fig. 1. The damper motor lever is then clamped to the rock shaft of the damper motor at such angle that at its highest position it will tightly close the damper, without necessitating any connection with the damper other than direct lifting contact.

Assuming that the draft of the furnace is fully checked, the check damper will be wide open and the draft inlet damper 17 will be tightly closed. There will at this position be either no hydraulic pressure in the pressure chamber of the damper motors or so little pressure that the damper motor springs can pull the rock shaft and hence the damper operating levers down to lowest position so as to permit both dampers to drop to their "down" position by gravity.

The springs of each damper motor are so adjusted that upon the rising water pressure of increased heat demand, the check damper 19 will first be moved upwardly and the spring tension of the draft inlet damper will not permit the draft inlet damper 17 to begin to open until the check damper 19 has been completely closed. When maximum heat demand and therefore maximum hydraulic pressure in the pressure chambers of the damper motors has been reached the check draft damper will be pressed tightly shut and the draft inlet damper will be lifted to its maximum opening.

Upon lessening heat demand, the much greater spring tension in the inlet draft damper control motor will result in complete closure of the draft inlet damper before the check draft damper begins to open. The above results in a wide range of draft control which is highly desirable. The springs are furthermore so adjusted that maximum draft position of the dampers is not attained until the maximum working pressure of the control system is reached, and the minimum draft position of the dampers is not reached until the minimum working pressure of the system is reached. The minimum working pressure must be enough to move the damper motor lever of the check-draft control motor 600' to lowest position against hydraulic lift or rise occurring between the damper motor and the water escapement, which in some cases will be located at or near the top of the furnace.

It will now be noted that in the installation illustrated by Fig. 1, both dampers will be lifted against gravity. Dampers must always be arranged to close by gravity or spring. In some cases such as with damper motor 600 the damper is hinged at the top and as the damper is lifted, the force required to do the lifting will increase. In the case of the check damper 19 which is hinged at the bottom, the force required to lift it is decreased as the damper reaches its upper position. To avoid the necessity of counterweights to eliminate or reduce the above effect, the springs of the draft inlet damper motor 600 are anchored in the upper hole 617 of the spring levers as shown in Fig. 1. As the rock shaft rotates toward open damper position, the anchor hole swings so that the lever arm effect of the spring in resisting rotation of the rock shaft will be reduced to at least in part compensate for the increasing force required to lift this damper.

In the case of the check draft damper motor 600', the springs are anchored in the lower spring anchorage holes of the spring levers. The arc of travel of the upper spring anchorage will therefore be such that the counter-torque induced by the spring upon the rock shaft will increase as the force required to lift the damper reduces the torque effect of the weight of the damper upon the rock shaft while the said damper is being lifted. This substantially cancels the decreasing force required to lift the damper.

The net result of the above spring counter balancing means will be that increasing hydraulic pressure in the damper motors will produce a substantially steady rate of draft increase. Without it, a small increase in hydraulic pressure would cause complete closure of the check draft damper 19 and large increase of pressure would be required to bring about closure of the draft inlet damper 17. This would result in jerky temperature control, the very thing which a scientific graduation of the heat volume supplied to the rooms is intended to avoid. The vital point is that progressive increase or decrease of operating pressure shall produce proportionally progressive increase or decrease of draft.

Another point is now to be noted. If each damper motor would be supplied with a piston, then each damper motor would operate full stroke to fully lift its damper, as soon as sufficient hydraulic pressure would be applied to initiate movement and assuming that the spring anchor arrangement fully balanced the dampers in all positions. Among the obvious advantages of employing a diaphragm instead of a piston is that the effective area of the diaphragm upon which hydraulic pressure is effective to cause movement, is maximum at the beginning of the up stroke and decreases as the stroke advances, especially after mid-stroke position is passed, and decreases still more rapidly as the end of the stroke is approached. This is due to an increasing portion of the hydraulic pressure applied to the entire area of the diaphragm being transmitted to the peripheral anchorage of the diaphragm as the stroke advances, and toward the end of the stroke, to an increasing portion of the outer periphery of the diaphragm coming into contact with the curved upper wall of the chamber containing the diaphragm. Added to the above is the resisting effect of increasing spring tension as the stroke advances, which effect may or may not be balanced out by the relative position of the spring anchorage holes in the spring anchor levers 614 previously described. The net result of all these forces is still to bring about movement of the damper lifting cycle which is closely proportional to the hydraulic pressure increase, referred to in the preceding paragraph.

*Auxiliary thermostats*

The construction of the auxiliary thermostats will now be described referring to Figs. 9, 10, 11 and 12:—This is essentially a tiny plunger actuated diaphragm valve of graduated action, similar to the valve of the room thermostat, but actuated by an expansion rod instead of bi-metallic blades. The valve is comprised of a valve body 401 having an inlet port 402, a diaphragm chamber 403, a centrally bored valve seat 404 leading to an outlet passage 405. Both inlet and outlet passages are adapted to connect to tubing. A flexible diaphragm 406 is clamped between the valve body and the housing cover 407 by means of screws 408. A plunger 409 when moved a few thousandths of an inch toward the valve seat deflects the central portion of the diaphragm to close or partly close the valve.

The thermo-motive operating mechanism consists of a tube 410 of metal having high heat expansion, theaded and screwed into the projecting boss 411 of the housing base casting 402. Within this tube and anchored to its outer end by any suitable means such as those shown is a rod 412 of metal having low heat expansion. This rod projects through a suitable opening in the housing base so that its pointed end will contact lever 413 which is pivotally held by a cross pin at 414. The free end of this lever is connected to a floating lever 415 by means of links 416 and pivotal cross pins 417 and 418.

This floating lever is fulcrumed upon the end of temperature adjustment screw 419 so that, when the expansion tube 410 cools and contracts it pushes the rod 412 against lever 413 which causes the free upper end of the floating lever 415 to move away from the point of the valve actuating plunger 409 so that the fluid pressure within the valve can press its diaphragm 405 away from its valve seat 404 to open it.

When the expansion tube is warmed, it expands and draws the rod 412 away from the lever 413. The compression spring 421 will then press the upper or free end of the floating lever 415 toward the valve which presses the plunger 409 inwardly to close the valve. A shouldered guide pin or screw 422 is passed through a suitable hole in the floating lever 415 to support and align it and it also holds the spring in place as will be apparent. This spring is proportioned to be strong enough to definitely close the valve against the pressure of the water in the valve but not strong enough to possibly damage the flexible diaphragm. Note that excessive heating or cooling of the expansion tube, or screwing the adjustment screw 419 in or out too far cannot possibly cause excessive pressure of plunger 409 against the diaphragm.

The temperature adjustment screw preferably contacts the hemispherical head of rivet 420 contained in the floating lever 415 as shown. A dial 423, graduated in temperature degrees, is rotatably mounted in central alignment with the said screw. The screw has a pointer 424 secured to its outer end. By rotating the screw inwardly or outwardly, the exact expansion tube temperature at which the valve is closed may be determined. After the screw has been adjusted, the dial may be rotated so that this temperature graduation is in registration with the pointer. The dial can then be locked in place by means of screws 425, Fig. 12. The length of the expansion tube, the leverage and pitch of thread of the adjustment screw are of such proportion that one rotation of the screw will enable the pointer to be set at any temperature within the intended range of control. The dial is graduated to show the exact temperature corresponding to fractions of a turn of the screw. A projecting pin 426 is secured to the dial so as to limit the possible rotation of the pointer within one turn.

A screw 427 serves to lock the temperature adjustment screw in place. The housing cover 407 and housing base 412 are clamped together by means of two cross screws (not shown) passed through holes 428 (Fig. 11). 429 is a dowel pin to insure proper alignment. The sides of the assembled housing contain apertures for free air circulation to keep the interior mechanism from becoming overheated. The expansion rod is inserted into the fluid which is to have its temperature limited or controlled.

Figure 20:
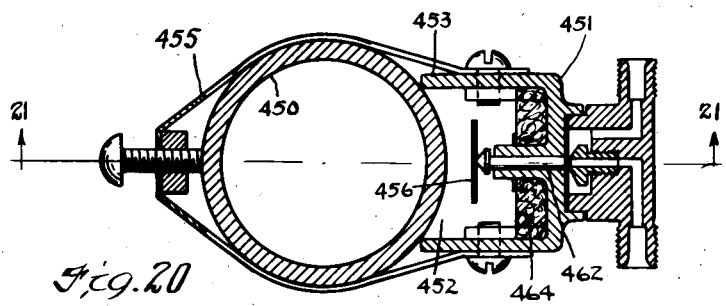
Figure 21:
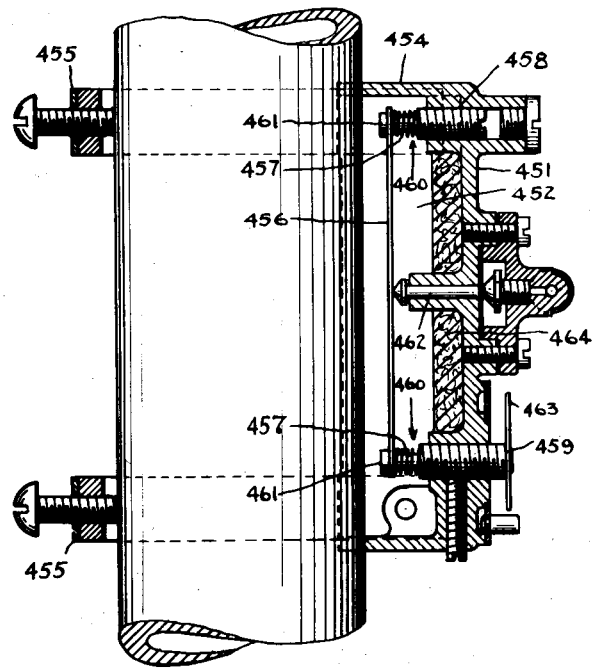

An alternate "clamp-on" form of auxiliary thermostat shown by Figs. 19, 20 and 21 will now be described:—This type is employed where it is not easily practicable to insert an expansion rod into the fluid, the temperature of which is to be controlled. 450 represents a hot water or steam pipe. The thermostat base 451 has a chamber 5 formed by side walls 453 and end walls 454 conformed to fit the pipe 450. Straps 455 serve to tightly clamp the entire instrument to the pipe. A bi-metal blade 456 is slotted to form a fork at each end which straddles the necks 457 of screws 458 and 459 so that springs 460 can press the said blade against the heads 461. When the bi-metal blade is warmed, it bends toward the valve, pushing plunger 462 toward the valve to close it. On the other hand, when the bi-metal blade becomes cooler it bends toward the pipe 450 permitting the valve to open. The valve construction is the same as in Figs. 9 and 10. The temperature adjustment screw 459 has a pointer and dial arrangement the same as in Figs. 10 and 12, all of which have been described. The screw 458 is for properly aligning the bi-metal blade and for calibrating the adjustment. 464 represents heat insulating material to reduce loss of heat from chamber 452 so that it will more closely assume the temperature of the fluid flowing through the pipe. Insulation around this pipe will presumably cover the side and end walls of the thermostat base to still further reduce the temperature drop between the chamber and the interior of the pipe. It will be obvious that either of the described types of auxiliary thermostats may be employed in my hydraulic heat control system.

*Steam pressure limit control*

Referring back to Fig. 1, it will be obvious that in the case of a steam heating system the auxiliary thermostats 400, 400' may be actuated by steam pressure instead of the temperature of the out flowing heated air or water. In that case, the intensity of the furnace fire will be limited by a steam pressure limit control device instead of temperature limiting auxiliary thermostats. Figs. 22 to 26 inclusive show a steam pressure limit control especially adapted for my hydraulic thermo-control system.

This device consists of a housing cover 471 clamped to a housing base 472 by means of cross screws 473. The chamber 474 thus formed contains a lever 475 pivoted upon cross pin 476. A flexible diaphragm 477 is peripherally clamped between housing base 472 and the cover 478 to form the steam pressure chamber 479. This diaphragm carries a central pointed screw 480 securely held in place by means of washer 481 and nut 482. A suitable chamber 483 and aperture 484 is provided in housing base 472 as shown, so that the point of screw 480 may contact the valve actuating lever 475 on one side.

A steam pressure adjustment screw 485 contains an axially bored recess 486 to receive compression spring 487, one end of which bears at the bottom of the bored recess and the other end against the inner side of a flange 488 of pin 489 which is held in axial alignment by the spring. This pin is pointed to contact the bottom of a conical depression 490 in lever 475 adjacent the axial center of the steam pressure adjustment screw.

A valve 491 of the same construction as my other control devices is opened or closed more or less by plunger 492 the point of which bears against the lever 475. The entire assembly may be clamped to a steam pipe 470 by means of strap 493. The steam pipe is then tapped by tube 495 which is looped as shown to form a water trap and connected to the inlet of the pressure chamber 479 so that the steam pressure existing within the pipe 470 will be communicated to flex the diaphragm toward the lever which will be swung toward the adjustment screw to compress its spring. The same outward swing of the lever 475 also pushes valve plunger 492 toward the valve to close it. The exact steam pressure at which the valve will be closed depends upon the adjustment of screw 485, as will be obvious. A pointer 494 and a concentric dial 496 graduated in pounds or ounces of steam pressure indicates the steam pressure limit for which the instrument is set. The stop pin 497 is secured to the dial, and limits rotation of the screw the same as in my auxiliary thermostats.

The head 498 of valve plunger 492, by contacting the face of the boss 499, prevents possibility of the plunger being compressed more than sufficient to close the valve.

It is to be noted that when the above described steam pressure limit control is connected as at 400, Fig. 1, it will tend to hold the fire at exactly the intensity which will hold the steam at the set pressure unless the room thermostat demands less heat. To the extent permitted by the rapidity of response of the heating plant, the steam pressure will be graduated to suit the needs demanded by the room thermostat except that as the set maximum pressure is approached, the pressure limit control device will throttle its valve which will in turn graduate the fire downwardly.

Thermostatic safety pilot

The thermostatic safety pilot will now be described. Referring back to Fig. 1 it will be remembered that an auxiliary thermostat connected as at 400″ will open its valve, when the fire becomes extinguished, and drain all pressure from the system, which shuts off all draft, fuel supply, etc. The safety pilot, shown by Figs. 27 to 30 inclusive, performs the same function except that it is actuated by a pilot flame, of a fluid fuel fired furnace or boiler, instead of by the condition of the main fire.

Gas supply for the pilot enters at 701 passes through passage 702, tube 703, orifice 704, air mixer 705, and burner ports 706; the flames being shielded by canopy 707. Another jet issues from port 708, the flame heating the bi-metal blade 709, held by canopy 707, which blade bends outward when heated, thus closing the water valve 710, which is of the same construction as has been described. 711 is the water inlet connected from tubes 5 or 7, Fig. 1. 712 is an outlet into the air as by tube 11, Fig. 1, or tube 713. The water valve plunger 714 is operated by lever 715 fulcrumed on the point of adjustment screw 716. The lower end of this lever is connected to lever 717 by means of links 718. Lever 717 is fulcrumed at 719, and its upper end engages the point of sliding rod 720, which is a continuation of sliding rod 721, being divided at 722 for convenience in unscrewing the burner assembly from the tube 703. A compression spring 723 aligned by shouldered pin or screw 724, presses the upper end of lever 715 toward the valve, tending to push the valve plunger 714 to close the valve. The spring pressure also tends to move the lower end of lever 715 toward the left, which causes the upper end of lever 717 to press the sliding rod 720 toward the bi-metal blade 709.

It will now be noted that the bi-metal blade 709 and the compression spring 723 work against each other. The blade and compression spring are of such proportions that when the bi-metal blade is cooled below, for instance, 200 degrees, it will overcome the pressure of the spring 723 and hold the water valve 710 open. The valve 710 will therefore drain all pressure from the variable pressure tubing system and no pressure can build up of sufficient amount to turn the furnace controls toward "On" position. But when valve 725 is opened to admit gas to the pilot burner and the said burner has been ignited long enough to heat the bi-metal blade above 200 degrees, then the bi-metal blade will release its pressure on sliding rods 721 and 722. The compression spring 723 will then be able to press the lever 715 toward the valve to close it. The water pressure in the control tube system can then build up to whatever pressure is demanded by the thermostats 200, 400, 400′ or their equivalents.

As long as the pilot burner remains lit, the water valve 710 will remain closed, but should the pilot burner extinguish, the bi-metal blade 709 will cool, move toward the right, and again cause the valve 710 to open and drain all pressure from the system, resulting in a complete shut-down of the fuel supply, etc.

The lever 717 has a hole to clear the spring 723. The screw 726 adjusts the maximum volume of gas which may be passed to the pilot burner. The adjustment screw 716, by moving the fulcrum point of lever 715 in or out, will determine the bi-metal temperature at which the valve 710 will be opened and closed. The higher this temperature, the more quickly after pilot extinguishment the water valve 710 will be opened.

The cap 727 is employed to close whichever side of the gas passage 701 is not employed as an inlet. In furnaces employing a plurality of pilots the cap 727 is replaced by a tube communicating with the adjacent pilot valve. In such case, when any one of a plurality of pilots extinguishes, all pressure will be drained from the control tube system. Similarly all pilots must be ignited before the control system can function to turn on the main fuel supply.

Hydro-actuated switch and fuel valve

The hydraulically actuated electric switch will now be described, referring to Figs. 36, 37 and 38. This consists of a base 650 below which the hydromotive mechanism is mounted. This mechanism includes a hydraulic pressure chamber 678 the inlet 660 of which is connected to the variable pressure tube line 5 of the thermo-control system. The central bolt 656, shown in mid-position, is axially moved in a downward direction by increased hydraulic pressure and in an upward direction by decreased hydraulic pressure. The means for accomplishing this will be more fully described later.

The base 650 has bearings 668, 668′ on opposite sides for rock shaft 667. A central lever 665 is secured firmly to the rock shaft by set screws 666. One end of a tension spring 677 is hooked to the outer end of lever 665 and the other end is anchored to the base 650 as shown in Fig. 37. This spring pulls the lever downward so that its arm 664 constantly maintains contact with the upper end of the central bolt 656 as it moves up or down. The axial movement of this bolt will therefore be translated into angular movement of the rock shaft 667 upon its axis.

One or more arms 669, 669′ are adjustably mounted to the rock shaft, being locked in position by screws 671, 671′. These arms terminate at their upper end in transverse flanges to which tube clips 670, 670' are bolted. These clips hold mercury switch tubes 675, 675' which are of a well known type in which a slug of mercury may be moved from one end to the other by tilting the tube one direction or the other from a horizontal position. In this way the mercury will make or break contact between electrical terminals contained within the tube. The switch tubes shown in Figs. 36 and 37 will make electrical contact when the right hand end is tilted downward and will break contact when tilted in the opposite direction.

648 is a casing fitting upon base 650 and 649 is a removable cover. 676 represents electrical leads to and from the switch, which pass through the insulator 673 which is bolted to the casing. 674 represents terminal connecting bolts and 672 represents electrical leads into the mercury switch tubes.

The pressure chamber 678 is formed by ring casting 651 and cover casting 652, between which and the base 650 the two flexible diaphragms 653 and 654 are peripherally clamped. A central and cylindrical separator casting 655 is also clamped between the two diaphragms, as shown, by the central bolt 658. A compression spring 661 seated at one end in adjustment cap 662 and bearing at the other end against nut 657 normally flexes the diaphragms upwardly as far as they can go, but the hydraulic pressure in chamber 678 is effective to flex the diaphragms downwardly against the force of the compression spring 661.

The mean diameter of the flexible portion of diaphragm 654 is larger than that of diaphragm 653. The area corresponding to the mean diameter of each diaphragm, less the area corresponding to the diameter of that portion of the separator 655 which contacts diaphragm 654 represents in each case the "effective area" of each diaphragm. The hydraulic pressure in chamber 678 is exerted outwardly against both diaphragms, tending to push them apart, but this is prevented by the central portion of the diaphragms being held in fixed relationship by the central bolt 658 and separator 655. Since the effective area of the larger diaphragm 654 is much greater than that of the smaller diaphragm 653, the hydro-pressure exerted against the larger diaphragm will predominate and the two diaphragms will be flexed downwardly against the compression spring.

To produce the required difference in effective areas of the two diaphragms, the central rigid diameter of the smaller diaphragm, which is clamped securely between washer 659 and the separator 655, is smaller than the central rigid portion of the larger diaphragm which is clamped securely between the washer 656 and the separator 655. The upper internal diameter of the ring 651 is also made smaller than the lower internal diameter of ring 651.

The upward force of the spring 661 may be so adjusted that the maximum hydraulic pressure will cause the central bolt to move downwardly to its maximum intended extent. This is accomplished by screwing the adjustment cap 662 in or out and locking it in position with the nut 663.

Fig. 37 shows the switch mechanism in mid-position, therefore under mean hydraulic pressure. It can readily be seen that higher hydraulic pressure will tilt the mercury switch tube 675 in a clockwise direction to make electrical contact inside the tube. Decreased hydraulic pressure will tilt the tube 675 in a counter-clockwise direction, breaking the contact inside the tube. The rotational position of each arm 669 relative to the rock shaft may be adjusted by means of screws 671 so that electrical contact is made in each tube when a certain hydraulic pressure occurs and again broken at a somewhat lower pressure. Since the hydraulic pressure occurring is the equivalent of a certain heat demand occurring, the herein described hydro-motive switch may be utilized to successively make or break electrical circuits whenever the heat demand respectively rises or falls to a given level, the said circuits controlling the speed of a motor employed to propel air through a furnace or other air heating means; or the motor may be employed to supply solid or liquid fuel to a furnace with or without accompanying air blast. The hydro-motive switch may also be employed for other purposes such as in ventilating and air cooling systems.

It will be obvious that the same hydro-motive mechanism may be applied to operate other forms of electric switches including rheostats.

Fig. 39 shows the same hydro-motive mechanism applied to a fuel valve in which 690 is the valve housing containing the inlet 680, valve port 681 and communicating with outlet chamber 683. A central rod 658' takes the place of bolt 658 in Fig. 37 and flange 659' takes the place of washer 659 and the head of bolt 658, to clamp the central portion of the smaller diaphragm to the separator 655. All parts in Fig. 39 that are identical with parts in Fig. 37 have the same reference number.

The operation of the hydro-motive mechanism of Fig. 39 will readily be understood after this mechanism in Fig. 37 is understood, noting however that in Fig. 39 this mechanism is reversed in position. Higher hydraulic pressure will therefore cause the central rod 658' to rise instead of descend. The valve shown in Fig. 39, while in vertical position with the hydro-motive mechanism on top, may be installed in any position.

The central axially movable rod 658' has an extension 692 which projects through the housing member 684 into the valve body to carry the movable valve member 685. It is to be understood that chamber 679 is open to atmosphere and chamber 689 is open to the inlet chamber 680.

Inspection will now show that the distance that the movable valve member is lifted from the valve seat 682 will be proportional to the hydraulic pressure existing in pressure chamber 678. After the spring adjustment cap 662 has been set to coordinate the volume of fuel that is passed by the valve to the existing heat demand as represented by the existing hydraulic pressure, the valve will pass as much fuel as is demanded by the thermo-control system to maintain intended room temperature.

The adjustment screw 686 is adjusted to limit the extent of valve closure so that no less fuel will be passed than the minimum that the burners which are supplied with fuel through this valve can safely and properly consume. The upper end of this screw, when adjusted, contacts the lower end of the extension 692 of the central rod 658', to prevent complete valve closure. 687 is a lock nut and 688 a cap to prevent leakage.

Thermo-control system with automatic circulating pump

It is within the scope of my invention to employ a pump to circulate and recirculate a liquid through the tubing and other units of my thermo-control system, instead of passing water obtained from the domestic water supply piping directly through the control system. This permits other liquids than water to be employed, for instance, a thin oil.

Fig. 40 shows such an application, with the thermo-control system shown diagrammatically in its simplest form. Preferably, water at city pressure is employed to actuate the pump that circulates the liquid through the thermo-control system. The said liquid will hereinafter be referred to as oil. The essential elements in such a pump unit are: an oil receiving chamber 322, open to atmosphere, to receive the oil returned from the control system; a high pressure chamber 324 having an air cushion 351 to provide continuation of pressure between pump strokes; a transfer chamber 320 to transfer oil from the receiving chamber to the high pressure chamber; automatically actuated oil pumping means; and a pressure governor 100 through which the oil escapes from the high pressure chamber into the thermo-control system, said pressure governor being set to pass the oil at lower pressure than the lowest pressure maintained in the high pressure chamber.

Tube 1 is the constant pressure tube line of the thermo-control system. 200 is the room thermostat and 225 represents its thermostatically actuated valve. Tube 5 is the variable pressure line leading into an escapement valve 335 which is throttled down to pass not to exceed about 180 drops per minute when the pressure in the variable pressure tubing 5 is at its highest. The escapement valve drips the return oil into the oil receiving chamber 322.

600 represents a hydraulic pressure actuated furnace controlling unit such as a damper motor, fuel supply valve or electric switch to control a motor to supply fuel or propel a heat circulating medium. There may be one or more such units all connected to variable pressure tube line 5.

The escapement valve corresponds in function to the escapement 500 of Fig. 1. The receiving chamber 322 corresponds to the drip cup 14 of Fig. 1 except that pump means are added to transfer the oil from the said receiving chamber into the high pressure chamber for recirculation. It will be apparent that auxiliary thermostats and any of the attachments or variations shown in Fig. 35 may be employed.

The pump unit comprises a flexible diaphragm 303 peripherally clamped between pump chamber casting 302 and transfer chamber casting 319, thus forming the pump chamber 301 and the transfer chamber 320. Water at city pressure to operate the pump is supplied by tube 85 leading from domestic water supply pipe 75. The pump mechanism is contained in the pump chamber 301, but will be described in detail further on. For the present it will suffice to state that the pump valve action is such that the diaphragm 303 is flexed slowly up and down from its lowest position shown in Fig. 40 to its highest position shown in Fig. 43. The upward or power stroke is caused by the water pressure and the down stroke by gravity.

The oil chambers 322 and 324 are formed by glass cylinders 321 and 323. These have proper washers at each end and are securely clamped between top castings 325, 326, and transfer chamber casting 319 by tie bolt means not shown.

At the bottom of the return oil chamber is a check valve 330 which permits oil to pass downwardly into the receiving chamber 320 during down stroke of the diaphragm 303 but permits no oil to pass during the up stroke of said diaphragm. At the bottom of the high pressure chamber 324 is a check valve 331 which permits oil to pass upwardly from the receiving chamber 320 into the high pressure chamber during up-stroke of the diaphragm 303, but permits no oil to pass downwardly from the high pressure chamber into the receiving chamber during the downward drop of the diaphragm. Both these check valves are of ordinary ball and spring type. The springs are very light. The area 333 represents mercury, the function of which will be described later.

The high pressure chamber 324, contains an outlet tube 328 which conducts oil from the bottom end of this chamber into the outlet 327 into which the inlet of governor 100 is screwed. All joints at the top end of this chamber are absolutely air tight. It will therefore be apparent that when oil is first pumped into the high pressure chamber 324 all air contained in this chamber above the inlet 332 of the tube 328 will be trapped. As the pressure in this chamber is increased by the pump, the air will be compressed. The space above the oil level 350 will therefore become an elastic air cushion. It will later be shown that the maximum pressure in high pressure chamber 324 will almost equal the water pressure of water supply tube 85. The downward (gravitational) stroke of the diaphragm 303 requires about 10 seconds to accomplish. During this period, oil will continue to flow out through tube 728 being impelled by the compressed air in space 751. A slight drop in pressure occurs in the high pressure chamber, but as the maximum pressure ordinarily is at 50 pounds per square inch, and as the pressure governor supplies oil to the thermo-control system at 25 to 30 pounds per square inch, the said drop in pressure in the high pressure chamber does not impair the pressure of oil delivered into the constant pressure tube 1 by the pressure governor 100. Since the tube 323 is glass, the continuous maintenance of the air cushion can be observed.

The oil receiving chamber 322 is air and oil tight at all points except for a breather port at the extreme top, such as the aperture shown at 329. This chamber will therefore always be subject to atmospheric pressure. The oil level will vary from a minimum as at 349 to a maximum as at 348. When the thermostat demands no heat, the oil chambers in the furnace operating units, represented by 600, will contain least oil and in consequence the oil level in chamber 322 will be at the highest point. When maximum heat is demanded by the thermostat, the oil chambers in the furnace control units will be filled to maximum and hence the oil level in 322 will be at lowest point.

The cylinder 321 is of glass so that the variation in oil level and the rate of oil drip from valve stem 347 can be plainly seen. If loss of oil occurs due to leaks or otherwise, the low level 349 will get near the bottom. The fact that replenishment is necessary will be plainly evident. Refilling may be accomplished by lifting the escapement valve out of its socket in top casting 325.

The pump mechanism will now be described. A central circular counter weight 304 is secured to the under side of the diaphragm by passing a screw 317 through a washer 316 and the diaphragm and clamping all said parts securely together. The bottom of the counter weight has a central projecting stem having a turned groove 305 to receive the forked end of the valve operating lever 306.

The valve operating lever is fulcrumed at 307 at which point two shouldered, side by side screws 307 are inserted through free fitting holes in the lever and screwed into the two bosses 308 as shown in Fig. 44. The right hand arm of the lever is forked and recessed to loosely but securely hold the valves 309 and 310 in proper parallel relationship, as shown in Fig. 41.

The valve operating lever rocks upon its fulcrum in response to up and down movement of the diaphragm and counter weight and it will be noted that the two valves always move together.

In their "down" position the inlet valve 310 is seated and closed, and the outlet valve 309 is open as shown in Fig. 41. In their "up" position, the outlet valve 309 is closed and the inlet valve 310 is open.

Each valve closes in the direction of the water flow. When the inlet valve 310 is closed, the pressure of water in the inlet 312 tends to hold it tightly shut. Similarly, when the outlet valve 309 is closed, the water pressure in chamber 301 tends to hold it shut. Both valves open against water pressure and to open either one a certain initial opening force must be applied.

In operation, the above two valves snap from one position to the other with a rapid action, one to closed position and the other to open position. The means for accomplishing this will now be described:—

When the water flows into the pump chamber 301, it presses the diaphragm 303 and counterweight 304 upward until the position shown in Fig. 43 is attained. This lifts the long arm of the lever, which is made of spring material, and flexes it as illustrated. The short arm of the lever will then pull downward on the outlet valve 309 against the water pressure in chamber 301. As soon as sufficient pull is exerted upon the outlet valve, it suddenly gives way and both valves are snapped to their opposite position, as in Fig. 41 by the spring lever 306. This opens the outlet 313 and closes the inlet 312.

The diaphragm 303 then starts dropping downward due to the counterweight and head of oil in chambers 320 and 322. The descending stroke is made as rapidly as permitted by the outflowing water through the open valve 309, outlet passage 313, and drain tube 314. Finally the diaphragm attains the position shown in Fig. 40. The downward weight effective upon the left hand end of the flat spring lever 306 is multiplied and converted into an upward thrust at the right hand end of the lever against the closed inlet valve 310. The spring lever will be flexed as shown in Fig. 40. The valves will be in the position shown in Fig. 41. As soon as the upward spring lever force against inlet valve 310 is sufficient to overcome the inlet water pressure tending to hold this valve shut, the flexure of the spring lever will snap both valves to their upper position. This will close the outlet port 313 and open the inlet port 312. Water then rushes into chamber 301 and the diaphragm will make its upward stroke as rapidly as permitted by the oil flowing from transfer chamber 320 into the high pressure chamber 324.

To enable the inlet valve 310 to be snapped against inlet water pressures up to, for instance 100 pounds, mercury 333 is added. Note that as the diaphragm descends lower, the mercury flows toward the center of the diaphragm until, at lowest diaphragm position shown in Fig. 40, the weight of most of the mercury is effective to press the diaphragm downward. On the other hand, as the diaphragm rises the mercury flows toward the outer periphery of the diaphragm as shown in Fig. 40 so that a small proportion of the weight of the mercury is effective to resist further upward movement of the diaphragm.

The water pressure below the diaphragm and the resisting liquid pressure above the diaphragm will always be in balance, therefore the diaphragm is not subjected to excessive strains. It may therefore be made relatively thin and flexible.

Note that lost motion is provided between the flat spring lever 306 and contact points 305, 307 and at the valve stems 309 and 310. The total lost motion thus provided is so proportioned that proper relative diaphragm movement and valve movement occurs.

The length of stroke of the pump diaphragm is determined by the pressure of the incoming water of tube 85. If this water pressure is higher than the water pressure for which the valve actuating mechanism is designed, the gravity drop of the diaphragm and its counterweight means will be insufficient to open the inlet valve against said excessive water pressure. Pump operation will then cease. For excessive water supply pressure, a pressure governor must therefore be placed in tube line 85 and set to deliver water at a pressure below the maximum inlet pressure for which the pump is designed.

The escapement valve consists of a valve body 335 having an inlet 336 leading to a chamber 337 containing a raised valve seat 338. A flexible diaphragm 339 is peripherally clamped between the valve body 335 and 340. This cap contains a flanged plunger 341 in axial alignment with the valve seat 338 and having an extension stem at the bottom below the flange which stem is adapted to press the diaphragm toward the valve seat to close its port more or less. The upper end of the plunger has a lift knob 342, the bottom of which bears against adjustment nut 343. A spring 345 presses the plunger down as far as permitted by the adjustment nut. This nut can therefore be adjusted to secure the correct valve opening and rate of drip. The lock nut 344 is then tightened to hold this adjustment.

If it is desired to manually turn the dampers of a furnace to a lower position temporarily, as when stoking the furnace, the operator merely lifts knob 342 to drain oil out of the control system until the oil pressure in tube 5 and the damper motors has been reduced enough to secure the desired damper position.

To manually secure a higher damper position a by pass tube from line 1 to line 5 can be added, the said by pass tube having a spring closed by pass valve similar to tube 3 of Fig. 1 and valve 513 of the escapement member 500 (see Fig. 34). As this by-pass is disclosed in Fig. 1, it is not repeated in Fig. 40.

The volume of water used by the pump will substantially equal the volume of oil that is circulated, therefore the water from the pump through tube 314 may be led into an evaporating pan in the furnace, retaining the same advantages which have been described in connection with the system shown by Fig. 1.

The advantages of the inclusion of a pump in my thermo-control system to circulate and recirculate a liquid through the thermo-control system are as follows:

As the water valves are either in tightly closed or wide open position, no clogging can ordinarily occur, hence no filter is necessary. A mere screen at the inlet of tube 85, not shown, is ample to prevent scale and the like from entering tube 85.

By exercising care that no dirt or the like will enter the tubing and control units during manufacture or installation and by employing a prefiltered liquid for the circulating medium of the thermo-control system, no clogging of valves, etc. can occur.

The circulating liquid that is employed may be one of a much lower freezing point than water. This will make the system immediately operative in a house that has been closed in severe winter weather.

In some districts the water may have a chemical action upon the tubing, etc., producing salts that may clog the fine valves of the thermostats and escapement. By employing a circulating medium such as a thin neutral oil for the thermo-control system and circulating the water only through the pump, the above difficulty is eliminated.

In districts having dirty water, or water containing biological matter, frequent changes of the filter tube would be necessary in the system shown by Fig. 1. The last described pump system enables this to be eliminated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a heat control system, the combination of a fluid conduit, means for supplying fluid under constant pressure to said conduit, pressure actuated means connected to said conduit for controlling the rate of heat output of a heating source, thermostatically actuated valve means located in the space to be heated, said valve means being also connected to said conduit and adapted to vary the pressure therein, a second thermostatically actuated valve means located at the source of heat and connected in said conduit for limiting the range of pressure generated therein, and a third thermostatically actuated valve means located at the source of heat and connected in said conduit for exhausting fluid therefrom upon the attainment of a predetermined minimum temperature.

2. In a heat control system, the combination of a fluid conduit, means for supplying fluid under constant pressure to said conduit, pressure actuated means connected to said conduit for controlling the rate of heat output of a heating source, thermostatically actuated valve means located in the space to be heated, said valve means being also connected to said conduit and adapted to vary the pressure therein, a second thermostatically actuated valve means located at the source of heat and connected in said conduit for limiting the range of pressure generated therein, a third thermostatically actuated valve means located at the source of heat and connected in said conduit for exhausting fluid therefrom upon the attainment of a predetermined minimum temperature, and a restricted outlet in said conduit for the escapement of fluid therefrom whereby there is normally a continuous flow in said conduit from said constant pressure supply means.

3. In a heat control system, the combination of a pressure actuated means for controlling the rate of heat output of a heat source, a thermostatically actuated valve located in the space to be heated and having an inlet and an outlet, a fluid conduit connecting said outlet to said pressure actuated means, a second conduit for supplying fluid under constant pressure to said inlet, and a second thermostatically actuated valve located at the source of heat and connecting said first-named conduit to the atmosphere, said second valve being adapted to exhaust fluid therefrom at a predetermined minimum temperature.

4. In a heat control system, the combination of a pressure actuated means for controlling the rate of heat output of a heat source, a thermostatically actuated valve located in the space to be heated and having an inlet and an outlet, a fluid conduit connecting said outlet to said pressure actuated means, a second conduit for supplying fluid under constant pressure to said inlet, a second thermostatically actuated valve located at the source of heat and connected in said second conduit for limiting the maximum pressure generated therein, a third thermostatically actuated valve located at the source of heat and interconnecting said first-named conduit and said second-named conduit, said third valve being adapted to limit the minimum pressure in said first-named conduit, and a fourth thermostatically actuated valve located at the source of heat connecting said first-named conduit to the atmosphere, said fourth valve being adapted to exhaust fluid from said conduit at a predetermined minimum temperature.

5. In a heat control system, the combination of a pressure actuated means for controlling the rate of heat output of a heat source, a thermostatically actuated valve located in the space to be heated and having an inlet and an outlet, a fluid conduit connecting said outlet to said pressure actuated means, a second conduit for supplying fluid under constant pressure to said inlet, a second thermostatically actuated valve located at the source of heat and connected in said second conduit for limiting the maximum pressure generated therein, a third thermostatically actuated valve located at the source of heat and interconnecting said first-named conduit and said second-named conduit, said third valve being adapted to limit the minimum pressure in said first-named conduit, a fourth thermostatically actuated valve located at the source of heat connecting said first-named conduit to the atmosphere, said fourth valve being adapted to exhaust fluid from said conduit at a predetermined minimum temperature, and flow resistant means connecting said conduit to the atmosphere.

6. In a heat control system, the combination of a liquid conduit, means for supplying liquid under constant pressure to said conduit, pressure actuated means connected to said conduit for controlling the rate of heat output of a heating source, thermostatically actuated valve means located in the space to be heated, said valve means being also connected to said conduit and adapted to vary the pressure therein, and pressure absorbing means connected in said conduit for dampening pressure variations therein, said pressure absorbing means comprising an air cushion chamber and a liquid inlet in the bottom of said chamber.

7. In a heat control system for a heating furnace having a draft inlet damper and a check draft damper, the combination of a fluid conduit, means for supplying fluid under constant pressure to said conduit, a pair of pressure actuated motors each connected to said conduit and adapted to open and close said dampers, respectively and thermostatic valve means located in the space to be heated and also connected to said conduit, said valve means being adapted to vary the pressure in said conduit, one of said motors being adapted to close said check draft damper and the other of said motors being adapted to open said draft inlet damper in sequence when a predetermined pressure is attained in said conduit.

8. In a heat control system for a fluid fuel fired furnace, the combination of a valve for regulating the rate of fluid fuel flow into said furnace, a pressure actuated motor connected to and adapted to open and close said valve, a water pressure conduit connected to said motor and to a source of constant pressure supply, a thermostatic valve located in the space to be heated and connected in said conduit, said thermostatic valve being adapted to vary the water pressure in said conduit and thereby to actuate said motor, an electric switch for energizing an air circulating motor, and a second pressure actuated motor connected to said switch and to said conduit for opening and closing the former.

9. In a heat control system, the combination of a fluid conduit, means for supplying water under constant pressure to said conduit, pressure actuated means connected to said conduit for controlling the rate of heat output of a heating source, thermostatically actuated valve means located in the space to be heated, said valve means being also connected to said conduit and adapted to vary the pressure therein, additional thermostatically actuated valve means located at the source of heat and connected in said conduit for limiting the range of pressure generated therein, and a constantly open restricted outlet connected in said conduit between said pressure actuated means and said second valve means for the escapement of water from said conduit whereby there is normally a continuous water flow in said conduit from said constant pressure supply means.

10. In a heat control system, the combination of a water pressure supply line, a thermostatic valve connected to said supply line and located in the space to be heated, pressure operated means for controlling the rate of output of a heat source, a conduit connecting the outlet of said valve to said pressure operated means, a flow resistant escapement valve connected to said conduit for withdrawing water therefrom, manually operated means for exhausting water from said conduit, and a conduit conducting water from said escapement valve to the evaporating pan of the heating system.

11. In a heat control system, the combination of a water pressure supply line, a thermostatic valve connected to said supply line and located in the space to be heated, pressure operated means for controlling the rate of heat output of a heat source, a conduit connecting the outlet of said valve to said pressure operated means, and a second conduit conducting water from the outlet of said valve to the evaporating pan of the heating system.

OTTO J. KUENHOLD.